United States Patent
Takamoto et al.

(10) Patent No.: US 7,308,481 B2
(45) Date of Patent: Dec. 11, 2007

(54) NETWORK STORAGE SYSTEM

(75) Inventors: Yoshifumi Takamoto, Kokubunji (JP); Yasuo Yamasaki, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 868 days.

(21) Appl. No.: 10/614,190

(22) Filed: Jul. 8, 2003

(65) Prior Publication Data
US 2004/0143643 A1 Jul. 22, 2004

(30) Foreign Application Priority Data
Jan. 20, 2003 (JP) ............................. 2003-010509

(51) Int. Cl.
*G06F 15/167* (2006.01)
(52) U.S. Cl. ...................... 709/215; 709/215; 709/217; 709/226; 709/245; 707/10
(58) Field of Classification Search ................ 709/215, 709/217, 226, 229, 245
See application file for complete search history.

(56) References Cited

U.S. PATENT DOCUMENTS

| | | | |
|---|---|---|---|
| 6,393,535 B1 * | 5/2002 | Burton et al. ............... | 711/158 |
| 6,718,372 B1 * | 4/2004 | Bober ........................ | 709/217 |
| 6,944,712 B2 * | 9/2005 | Weber et al. ................ | 711/114 |
| 6,961,836 B2 * | 11/2005 | Weber et al. ................ | 711/114 |
| 6,977,927 B1 * | 12/2005 | Bates et al. .................. | 709/211 |
| 7,103,665 B2 * | 9/2006 | Shinohara et al. ........... | 709/226 |
| 7,136,883 B2 * | 11/2006 | Flamma et al. .............. | 707/204 |
| 2003/0229690 A1 | 12/2003 | Kitani et al. | |
| 2004/0010562 A1 | 1/2004 | Itonaga | |
| 2004/0078467 A1 | 4/2004 | Grosner et al. | |
| 2005/0071560 A1 * | 3/2005 | Bolik .......................... | 711/203 |

FOREIGN PATENT DOCUMENTS

| | | |
|---|---|---|
| JP | 2001-67187 | 3/2001 |
| JP | 2002-132455 | 5/2002 |
| JP | 2002-196961 | 7/2002 |

* cited by examiner

*Primary Examiner*—Ario Etienne
*Assistant Examiner*—Ramy M Osman
(74) *Attorney, Agent, or Firm*—Mattingly, Stanger, Malur & Brundidge, P.C.

(57) ABSTRACT

A network storage system for providing many clients with file services is structured to enable layered management of clients. A client management device is disposed between each client and a network file device provided with a disk unit. The network file device allocates a disk area to the client management device, and sets and manages access privileges of the client management device. The client management device allocates a disk area to each clients and sets and manages the access privileges of each client.

14 Claims, 23 Drawing Sheets

FIG. 15

| IP ADDRESS OF CLIENT | PORT NUMBER OF CLIENT | REPLACED IP ADDRESS | REPLACED PORT NUMBER |
|---|---|---|---|
| 192.168.0.10 | 2000 | 192.168.10.10 | 10000 |
| 192.168.0.20 | 2001 | 192.168.10.10 | 10001 |
| ... | ... | ... | ... |

FIG. 19

| FILE NAME | USER IP | FILE ATTRIBUTE |
|---|---|---|
| /USER/A/FILE 1 | 501 | RW |
| /USER/A/FILE 2 | 501 | RWX |
| /USER/B/FILE 3 | 502 | R |
| /USER/C/FILE 4 | 503 | RW |
| /USER/C/FILE 5 | 503 | RW |

1701 / 1702 / 1703

NETWORK STORAGE SYSTEM

BACKGROUND OF THE INVENTION

1. Field of the Invention

The present invention relates to a method for managing clients of a network storage system efficiently.

2. Description of Related Art

In recent years, storages have been expanded in capacity and reduced in price. Especially, with the progress of the techniques related to magnetic disks for realizing high recording density, it is about to be realized that one housing of storage comes to have a capacity of several tens of terabytes, which has been impossible so far.

On the other hand, networks have also been enhanced. In recent years, there have appeared even low priced networks that realize transfer rates of one gigabits/sec to 10 gigabits/sec. Conventional networks have been limited in transfer rate just within 10 megabits/sec to 100 megabits/sec, so that it has been difficult to build up an efficient system for transferring mass of data; the conventional system transfer performance is often degraded significantly when many users attempt to access a network concurrently. However, it cannot be impossible to build up a system that meets such requirements with use of a network of which transfer rate is one gigabits/sec to 10 gigabits/sec.

Under such circumstances, much attention is paid now to a network storage system, which is connected to a network and the users (clients) of the system are permitted to access the data stored in a common storage through the network. For example, JP-A No. 196961/2002 discloses a configuration of such a network storage system. In that system, a network connecting part, a server processing part, and a disk unit are disposed in the same housing. Each client accesses the common storage through the network using a communication method provided from the server, thereby the clients can input/output data stored in the server connected to the network as if the data is stored in itself.

One of the problems that must be solved with respect to such network storage systems that are getting to be expanded in scale is how to manage the storages. As a storage is expanded in scale, the method for managing the performance and its clients comes to be complicated. For example, JP-A No. 132455/2002 discloses such a method for managing a large-scale storage. According to the method, a large-scale memory unit for caching clients' data is connected to a subject network. This method is often employed to solve problems that might occur when in realizing of large scale high performance storages. On the other hand, JP-A No. 67187/2001 discloses a method for managing clients. The method enables a few managers to manage clients of storages disposed in a single housing.

A small scale storage can be managed by a few managers, since the number of clients is small. In the case of a large scale magnetic disk, however, the total capacity of one storage housing often becomes several tens of terabytes. In such a case, it is expected that the number of clients becomes several thousands to several tens of thousands. Management of clients mentioned here means allocating a storage area to each client and setting an access privilege for the client with respect to the allocated area. For example, each client comes to have a network (IP) address, a disk area name (/user/a), an access privilege (to read/write data from/to the allocated disk area), etc. set for the client. If such a client moves, the setting of the client must be updated.

SUMMARY OF THE INVENTION

In order to solve the above conventional problems, the present invention provides a network storage system, which is connected to a network to which a plurality of clients are connected. The network storage system comprises a network file device for managing a plurality of disk devices and a client management device for relaying access requests from the clients to the disk devices, translating addresses of the clients to its own addresses so as to enable accesses to the disk devices. Consequently, a plurality of clients come to look like one client group from each disk device, so that the system can omit a process for setting data for each client individually.

According to another aspect of the present invention, the network storage system is connected to a network to which a plurality of clients are connected. And, the system includes a network file device for managing a plurality of disk devices and a client management device for relaying access requests issued from clients to the disk devices. The network file device allocates a predetermined area of each disk device to the client management device, which then divides the allocated area and allocates the divided areas to the plurality of clients. Consequently, each disk device can regard a group consisting of a plurality of clients as the minimum unit to allocate one area to the group, thereby the system can omit a process for setting data for each client individually.

Furthermore, the network file device has a primary cache for storing copy information, which is at least part of the disk device information. The client management device has a secondary cache for storing part of the copy information stored in the primary cache and corresponding to the predetermined area allocated itself. Consequently, the client management device can speed up accesses apparently. The network file device and the network storage system may be united into one or separated from each other and connected to each other through a network.

Furthermore, in order to solve the above conventional problems, the network storage system of the present invention is configured by a first device provided with a disk device and a second device for connecting a plurality of clients. The first and second devices are used to manage the plurality of clients in layers, thereby management of the clients can be done efficiently. More concretely, the first device allocates an area to the second device and sets an access privilege for the second device while the second device sets data for each client individually. The second device is usually provided for each network area and required to manage only the corresponding network area. Furthermore, the second device transfers each access request issued from each client to the first device. At that time, the second device translates IP addresses of a plurality of clients into one IP address and adds a disk area name allocated particularly to itself to the name of the disk area to access.

BRIEF DESCRIPTION OF THE DRAWINGS

FIG. 15 is a structure of an IP address translation table;

FIG. 19 is a structure of a file management table;

DETAILED DESCRIPTION OF THE PREFERRED EMBODIMENTS

First Embodiment

Hereunder, a description will be made in detail for a clients managing method in the first embodiment of the present invention with reference to the accompanying drawings.

Figure 1:
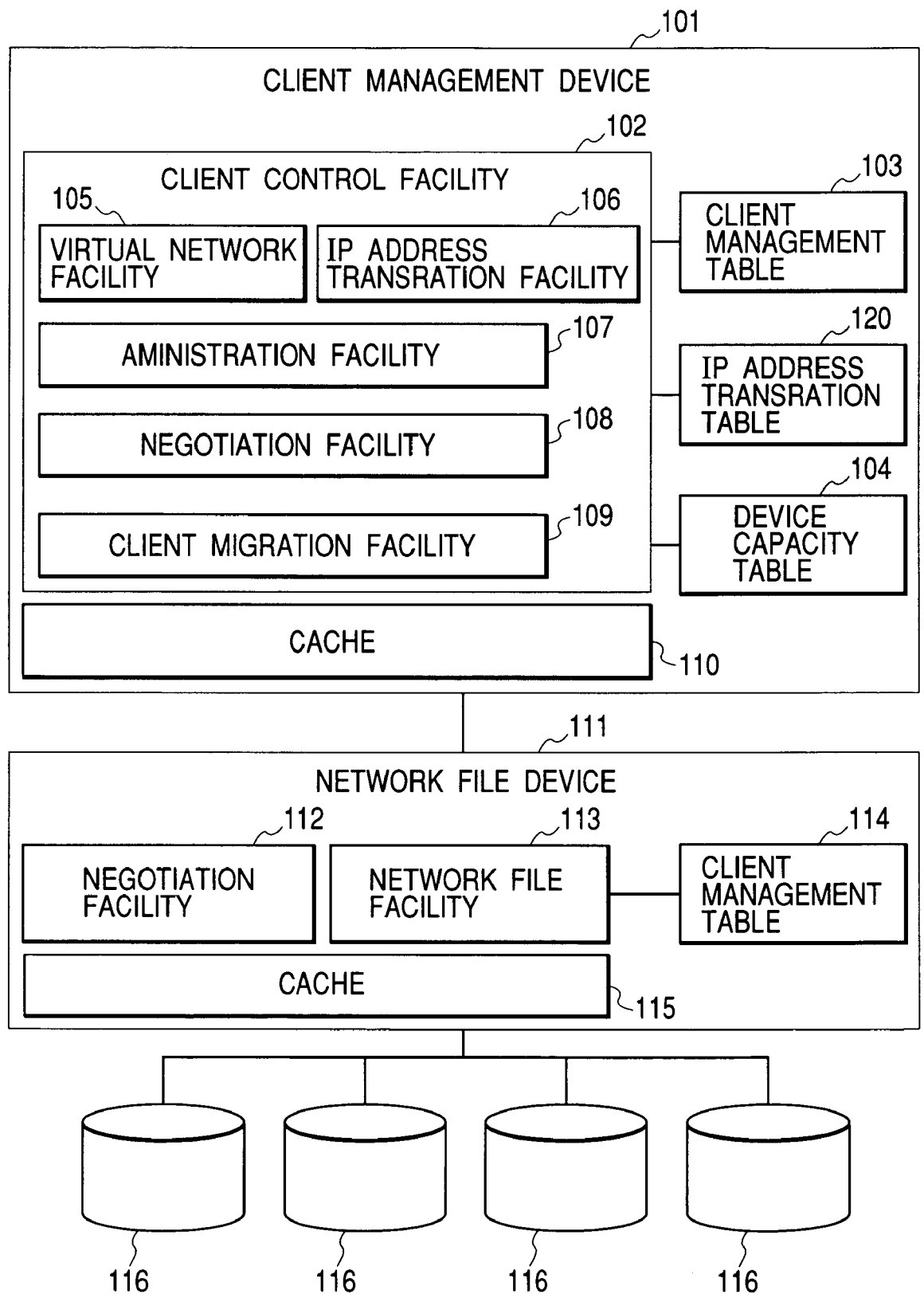
FIG. 1 is an overall block diagram of a network storage system in the first embodiment of the present invention.

FIG. 1 shows a schematic block diagram of a network storage system in the first embodiment of the present invention. Reference numeral 101 denotes a client management device, which is roughly divided into a client control facility (102), a client management table (103), an IP address translation table (120), a device capacity table (104), and a cache (110). The number of the client management devices (101) can be increased to two or more for each network. The client management device (101) manages disk areas used by the clients of each network and whether to enable each client to be connected to the allocated area. The client control facility (102) is configured by a virtual network facility (105), an IP address translation facility (106), an administration facility (107), a negotiation facility (108), and a client migration facility (109). The client control facility (102) is connected to a network file device (111). The network file device (111) retains clients' data. The network file device (111) is configured by a negotiation facility (112), a network file facility (113), a client management table (114), a cache (115), and a disk (116). The client management device (101) allocates a disk area supplied from the network file device (111) to each client, manages whether to enable each client to be connected to the allocated disk area, and the clients themselves.

Figure 2:
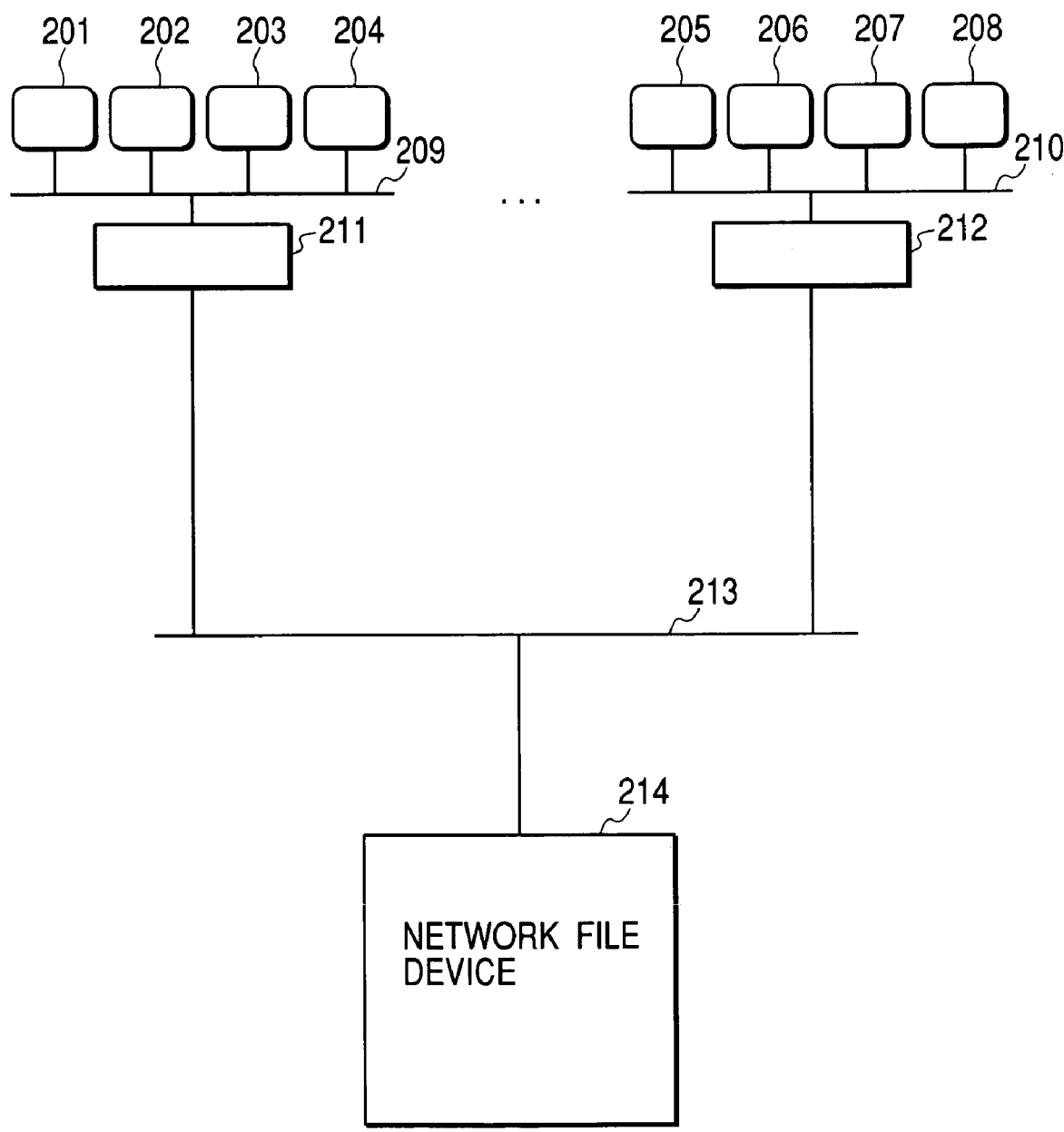
FIG. 2 is a block diagram of a network of the present invention.

FIG. 2 shows the position of the client management device in the network storage system in this first embodiment. The clients (201 to 208) are connected to their networks (209, 210) respectively. The client management devices (211, 212) are also connected to their networks (209, 210) and their common network file device (214) through a backbone network (213). All the clients (201 to 208) can access the network file device (214) through their client management devices (211, 212). The backbone network 213 is dedicated to the network file device (214). The client management device (211) controls/manages the clients (201 to 204) connected to the network (209). The client management device (212) controls/manages the clients (205 to 208) connected to the network (210). Because the client management device is employed in this first embodiment, the managers of the network file device is not required necessarily to manage all the clients (201 to 208); each of the managers is just required to manage his/her client management device (211, 212).

Figure 3:
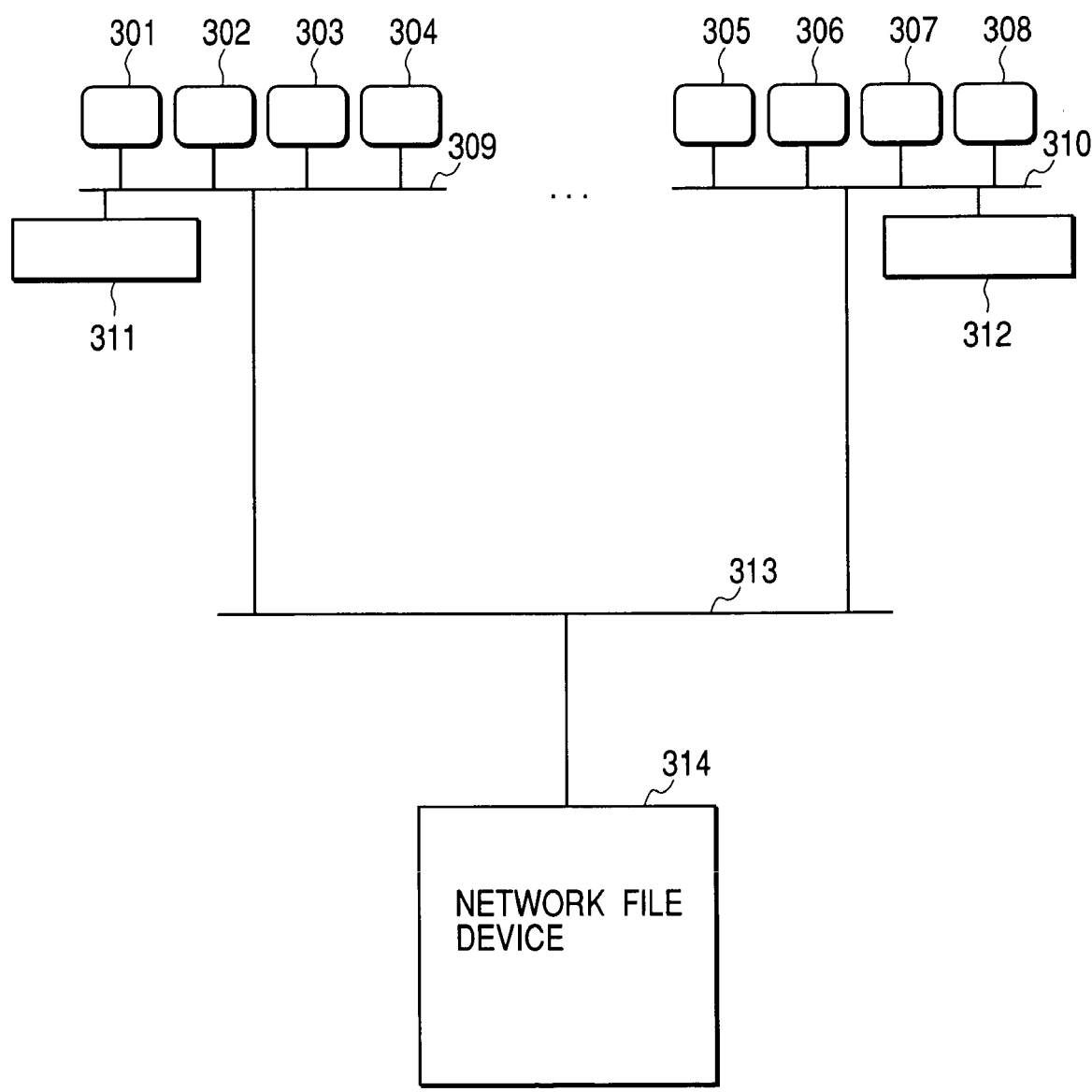
FIG. 3 is another block diagram of the network of the present invention.

On the other hand, FIG. 3 shows a general method for using a client management device. The clients (301 to 308) are connected to their networks (309, 310) while the client management devices (311, 312) are connected to their networks (309, 310) just like the clients (301 to 308). In this case, each network is not dedicated to the network file device (314); it may also be used for other purposes. When compared with the configuration shown in FIG. 2, the networks (309, 310, 313) are used more widely for various purposes. Therefore, the network security of the networks shown in FIG. 2 may be higher. The client management device (311) controls/manages the clients (301 to 304) connected to the network (319). The client management device (312) controls/manages the clients (305 to 308) connected to the network (310). Because the client management device shown in FIG. 2 is employed in this first embodiment, the managers of the network file device are not necessarily to manage all the clients (301 to 308); each of the managers is just required to manage his/her client management device (311, 312). The configuration and effect shown in FIG. 3 are the same as those shown in FIG. 2. The client management device in this first embodiment can apply to both of the client management devices shown in FIGS. 2 and 3.

Figure 4:
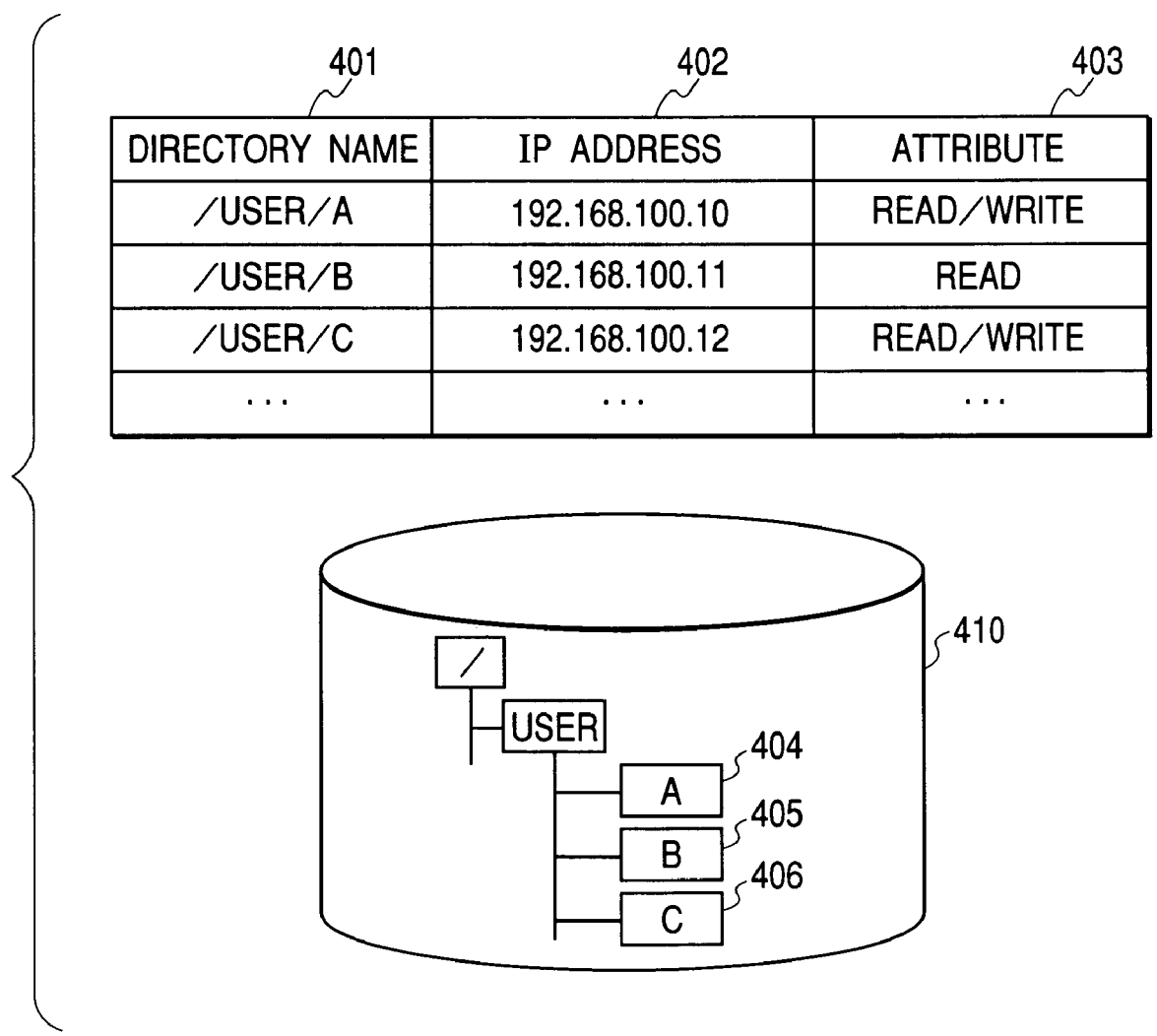
FIG. 4 is a structure of client management information in a network file device.

FIG. 4 shows a general structure of the client management device provided in the network file device. This management tables (103, 114) shown in FIG. 1. A column 401 describes disk directories (404 to 406) in a disk (410). A column 402 describes IP addresses of clients who disclose the directories described in the column 401. A column 403 describes attributes of the directories. An attribute "read/write" enables both reading and writing. An attribute "read" enables only reading (and disables writing). The client management table must describe all the connected clients. Now that the disk capacity is getting to increase, tens of thousands of clients must often be managed and accordingly, the work load of the client management table manager becomes heavy.

Figure 5:
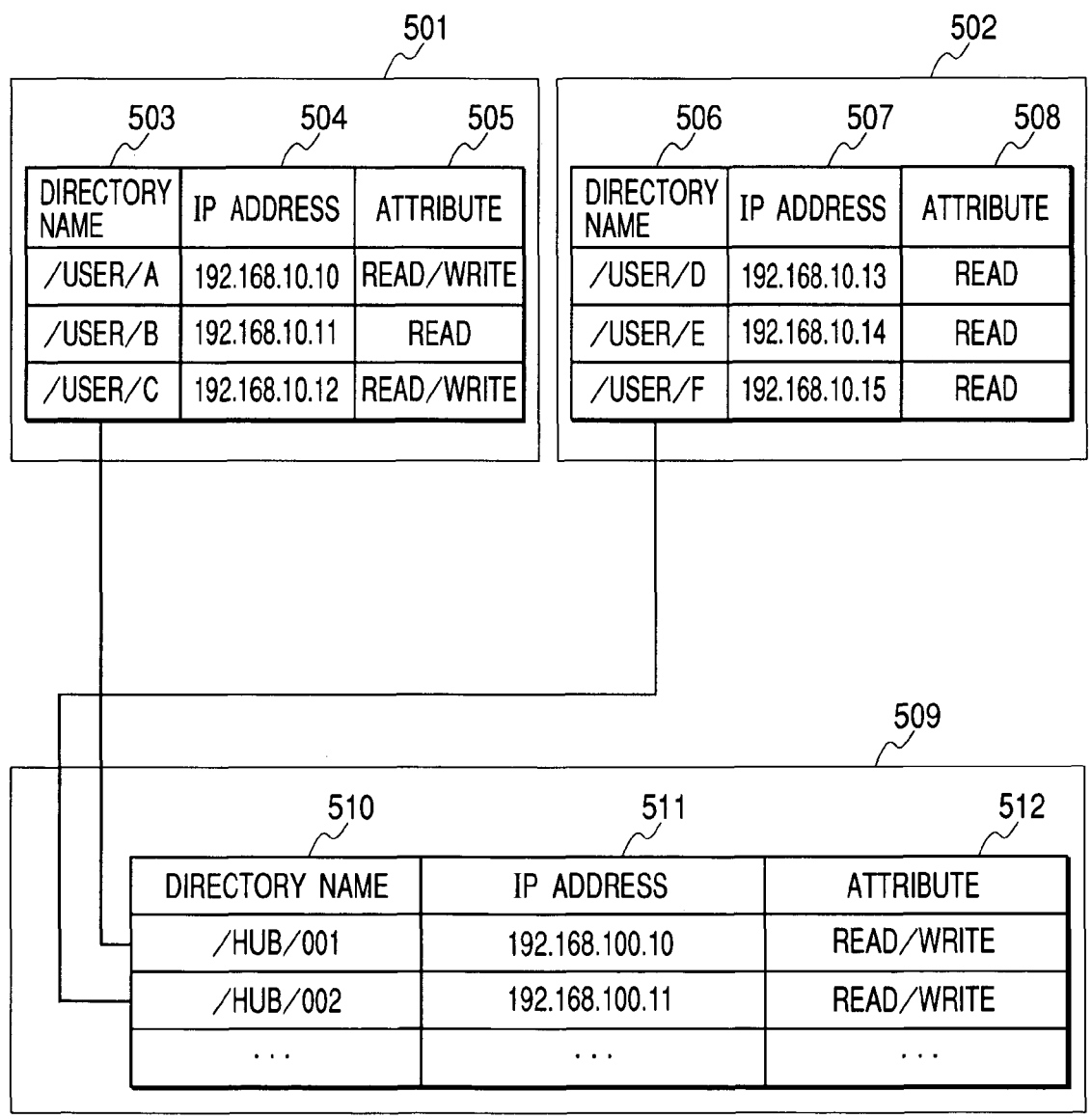
FIG. 5 is a structure of client management information in the first embodiment of the present invention.

FIG. 5 shows a structure of the client management table in this first embodiment. In this first embodiment, the client management table is structured in layers. Reference numeral 509 denotes a client management table (114) provided in the network file device and reference numeral 501/502 denotes a client management table (103) provided in the client management device (101). A column 510 describes directories in the network file device, which are disk areas supplied to the client management devices (501, 502). A column 511 describes IP addresses of the client management devices (501, 502). A column 512 describes attributes opened to the client management devices (501, 502). Columns 503 and 506 describe directories in the network file device, which are disk areas supplied to the clients. Columns 504 and 507 describe IP addresses of clients. Columns 505 and 508 describe attributes opened to the clients. In this first embodiment, the manager of the network file device (509) is just required to manage his/her client management device (501, 502), so that his/her management load is reduced significantly. The client management device (501, 502) enables the client manager to correspond to the form of each network. The manager of the client management device (101) shown in FIG. 1 controls the client management device (102) through the administration facility (107). Usually, the manager accesses the administration facility (107) through a network. At this time, the administration facility (107) requests the user to input both user identifier and password to enable the user to control the client management device (102) after the user is authenticated. The administration facility can also give instructions to the client migration facility (109) to be described later and receive responses of processings therefrom.

Figure 6:
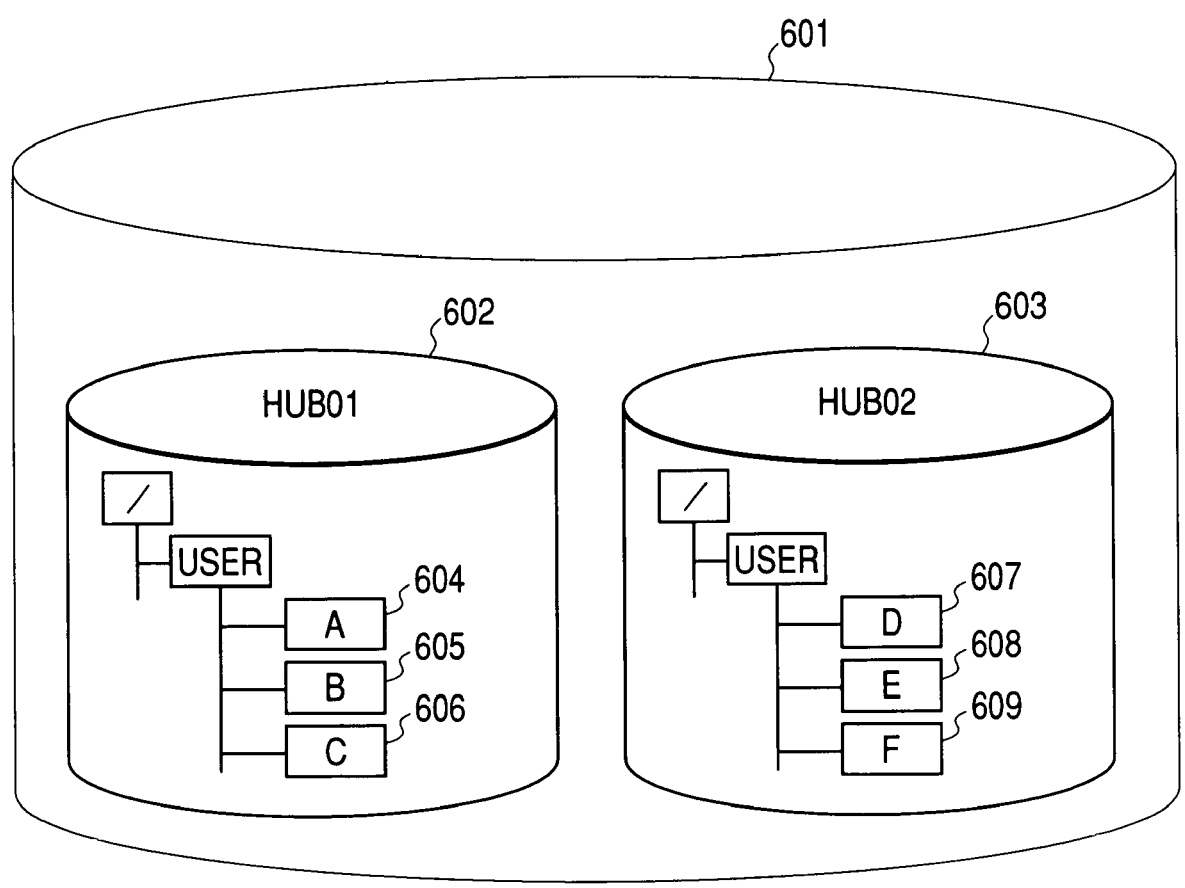
FIG. 6 is a structure of disk management information in the first embodiment of the present invention.

FIG. 6 shows an image of a disk in this first embodiment. Client data is stored in a disk 116 shown in FIG. 1. In this first embodiment, the client management device divides a disk (601) into a plurality of virtual disks (602, 603). The reference numerals 602, 603 denote directories in a disk (601) opened to the client management device. The client management device has a function for making the clients think that the directory 602 or 603 is actually an existing disk. The clients' areas managed by the client management device that has a directory 602 are denoted with 604 to 606. The clients' areas managed by the client management device that has a directory 603 are denoted with 607 to 609. This function is mainly used to improve the disk security. In the conventional client management method, many user data items have been stored one-dimensionally in a large scale disk. And, this has often caused errors in directory attribute setting, resulting in leakage of information to many other clients. In this first embodiment, references to virtual disks can be limited by making a single disk look like a plurality of virtual disks from each client. This makes it possible to minimize such information leakage.

Next, this first embodiment will be described more in detail with reference to the accompanying drawings.

Figure 7:
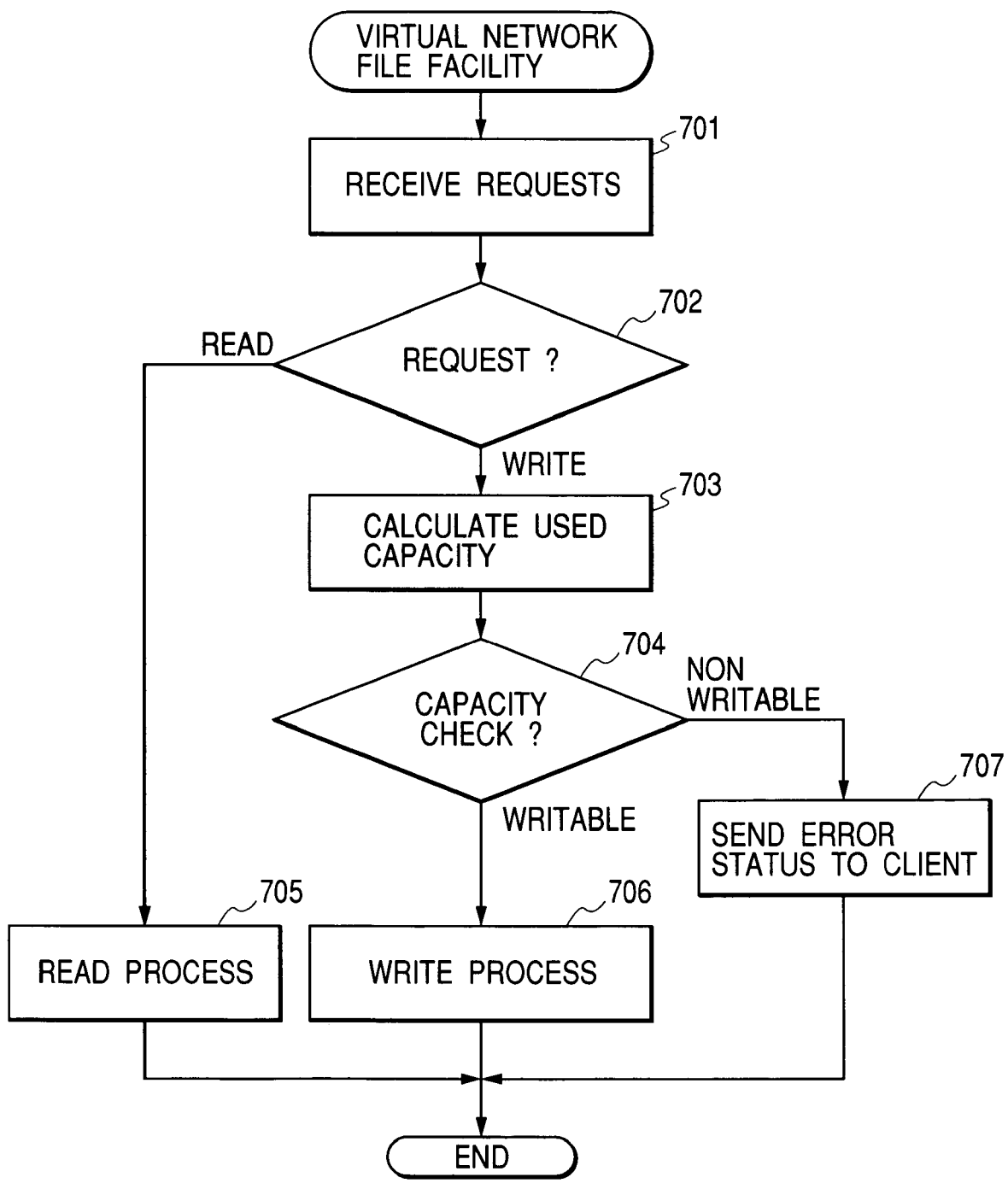
FIG. 7 is a flowchart of the processings of a virtual network file facility.

FIG. 7 shows a flowchart of the processings of the virtual network file facility (105). In step 701, the facility (105) accepts a request from a client. In step 702, the facility (105) checks whether the request is a read request or write request. If the request is a read one, control goes to step 705. If the request is a write one, control goes to step 703. In step 703, the facility (105) calculates a disk capacity allocated to the network file device (111). This calculation is made with a general method for converting a directory capacity into a disk capacity. In step 704, the facility (105) checks whether or not the writing is done over a predetermined disk capacity. This check is made according to the predetermined capacity described in the device capacity table shown in FIG. 1, the actually stored data capacity, and the capacity of the data to be written. If the predetermined capacity is to be exceeded, control goes to step 707 in which the facility (105) notifies the client of the capacity shortage. If writing is possible, control goes to step 706 in which the facility (105) writes the data. In step 705, the facility (105) reads data. The write and read processings in steps 706 and 705 will be described in detail later. In this first embodiment, the limitation set in step 704 prevents a specific client from occupying the disk capacity. In each conventional network file device, it has been difficult to limit the capacity of each disk directory. However, this function makes it possible to distribute a disk capacity to each client equally.

Figure 8:
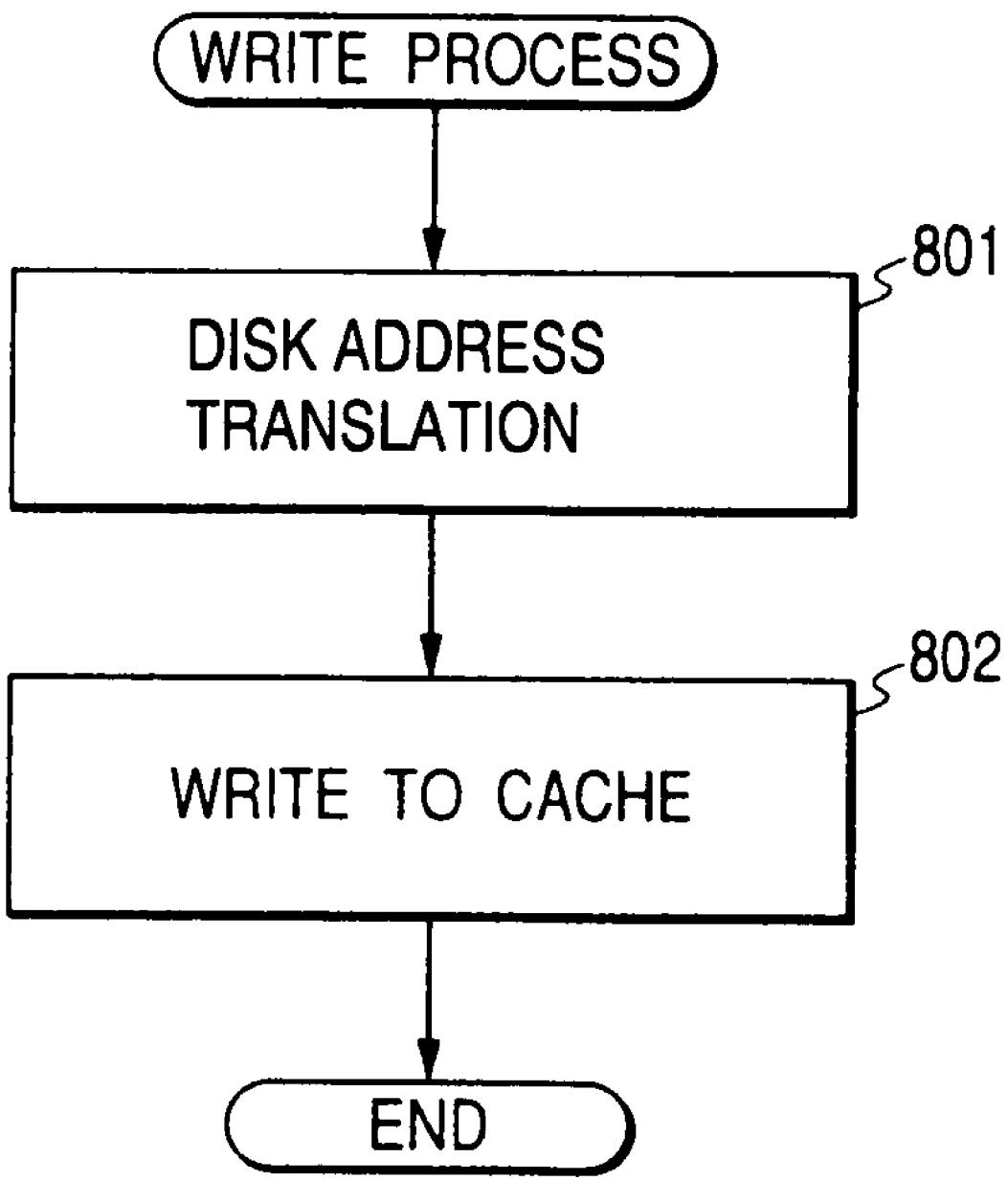
FIG. 8 is a flowchart of a write processing.

FIG. 8 shows a flowchart of the write processing. In step 801, the facility (105) makes disk address translation. This step is one of the features of this first embodiment. As shown in FIG. 6, the client management device has a function for creating virtual disks. If a client is to write data in a directory /user/A/file1, the client management device adds a directory name /HUB01 allocated to itself to the request from the client and translates the disk address to /HUB01/user/A/file1. Although this /HUB01/user/A/file1 is the original directory, the facility (105) makes such disk address (directory) translation in step 801 so that the client does not know the translation. In step 802, the facility (105) writes the data in the cache (110), then ends the writing. The data written in the cache (110) is written to the network file device (111) periodically in the cache write processing as shown in FIG. 9.

Figure 9:
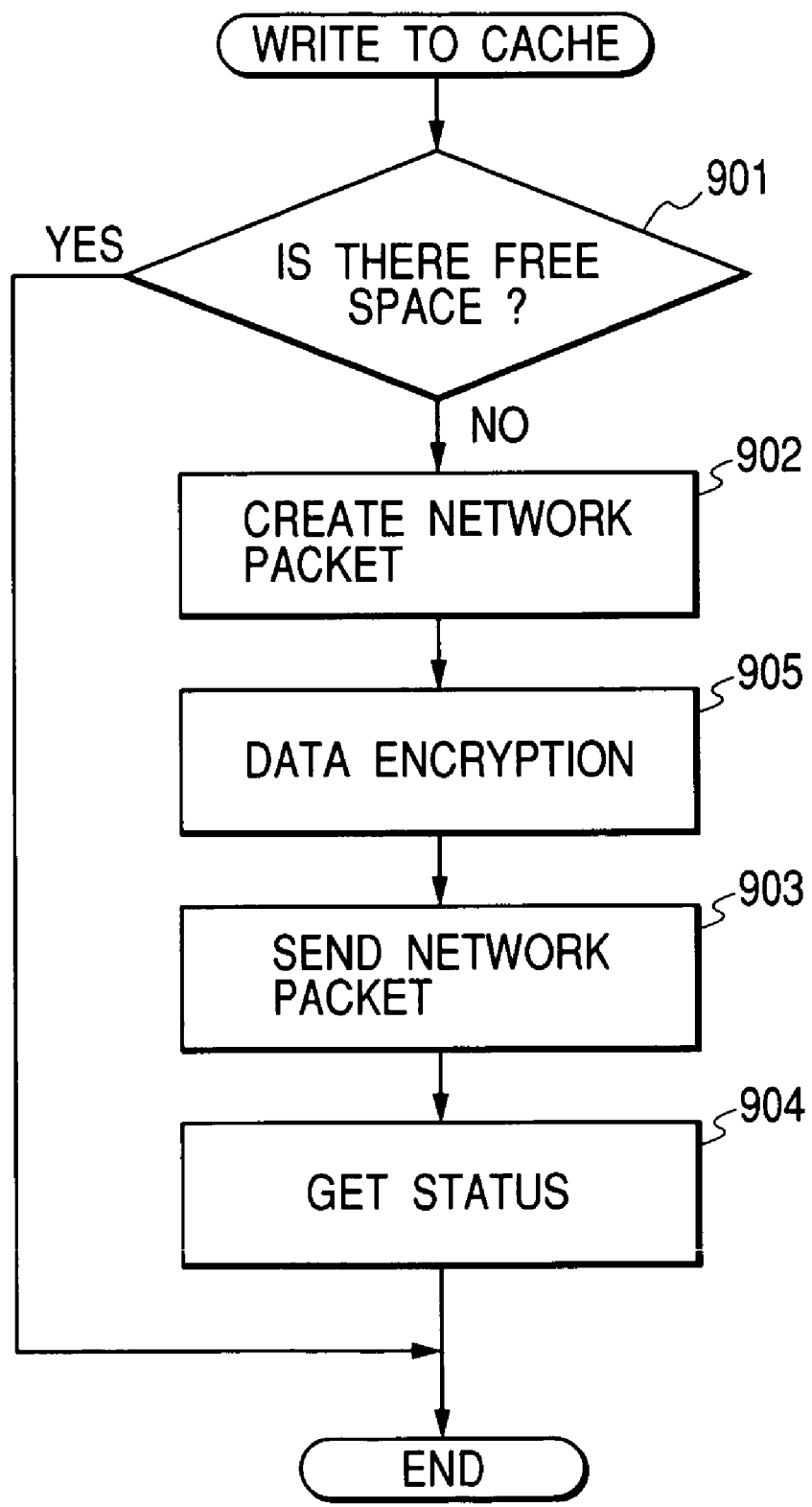
FIG. 9 is a flowchart for writing data to a cache.

FIG. 9 shows a flowchart for writing data stored in the cache (110) of the client management device to the network file device (111). This processing is executed periodically, for example, every 30 seconds. In step 901, the facility (105) checks how much a free space is left in the cache (110). If the free space is, for example, over 20% of the whole cache (110), the facility (105) ends the processing without writing any data in the cache (110). If the free space is not sufficient, control goes to step 902, in which the facility (105) generates a network packet. The client management device and the network file device are connected to each other through a network. Data to be transferred between those devices must be grouped as network packets. In step 905, the facility (105) encodes the data. This is to further improve the communication security. In step 903, the facility (105) sends the network packet generated in step 902 and encoded in step 905 to the object. In step 904, the facility (105) analyzes whether or not the data is sent to the object normally.

Figure 10:
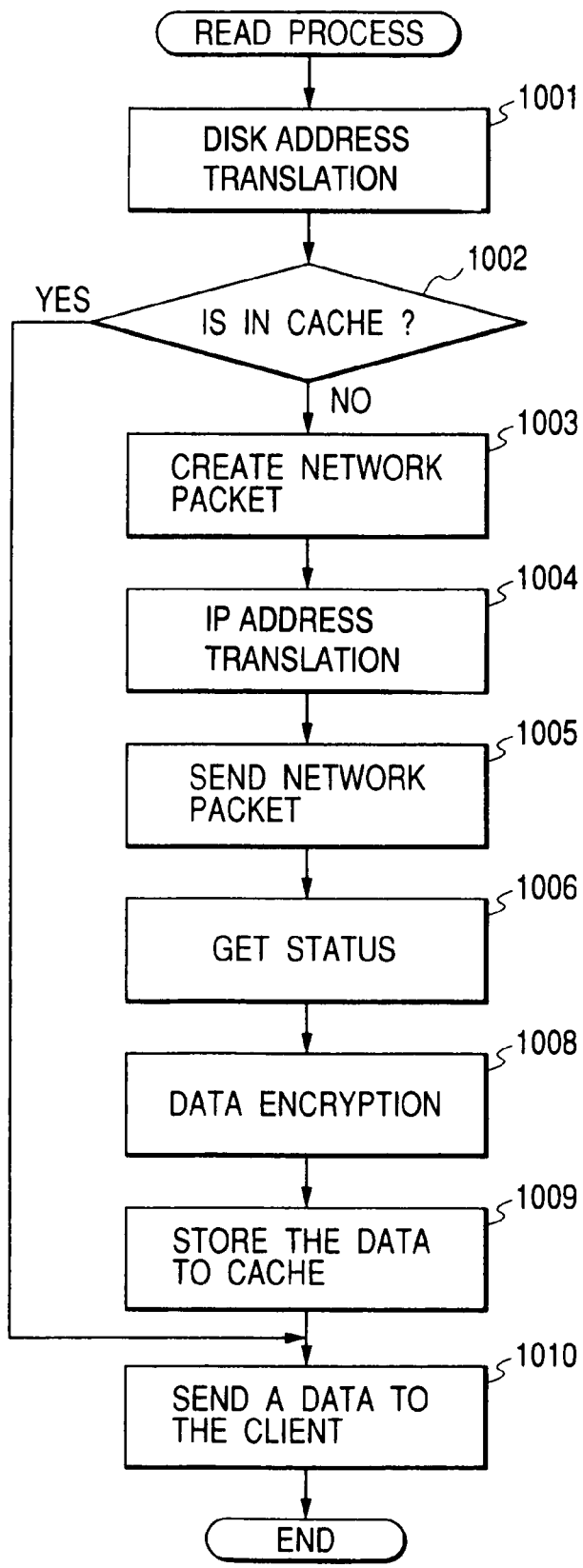
FIG. 10 is a flowchart for reading data from the cache.

FIG. 10 shows a flowchart of a read processing. In step 1001, the facility (105) makes disk address translation. This is the same processing as that in step 801 shown in FIG. 8, that is, translating a read file address to an address stored actually in the network file device. In step 1002, the facility (105) checks whether or not predetermined data exists in the cache. If the check result is YES (exist), control goes to step 1010. If the check result is NO (not exist), control goes to step 1003, in which the facility (105) generates a network packet. This is the same processing as that in step 902 shown in FIG. 9. In step 1004, the facility (105) makes IP address translation, which translates the IP addresses of many clients to a single IP address to be transferred to the network file device (111). With this processing, the network file device (111) comes to be able to process requests from many clients just like requests from one client. The details of this processing will be described later. In step 1005, the facility (105) transfers the generated network packet to the network file device (111). In step 1006, the facility (105) receives data from the network file device (111) and analyzes the communication state. If an error occurs in the communication, control goes back to step 1003, then the facility repeats the processings in and after the step 1003. In step 1008, the facility (105) decodes the data. In step 1009, the facility (105) stores the read data.

Consequently, the facility (105), upon the next access to the data, reads the data from the cache, thereby speeding up the read processing. In step 1010, the facility (105) transfers the read data to the subject client.

Next, the IP address translation facility (106) will be described.

Figure 11:
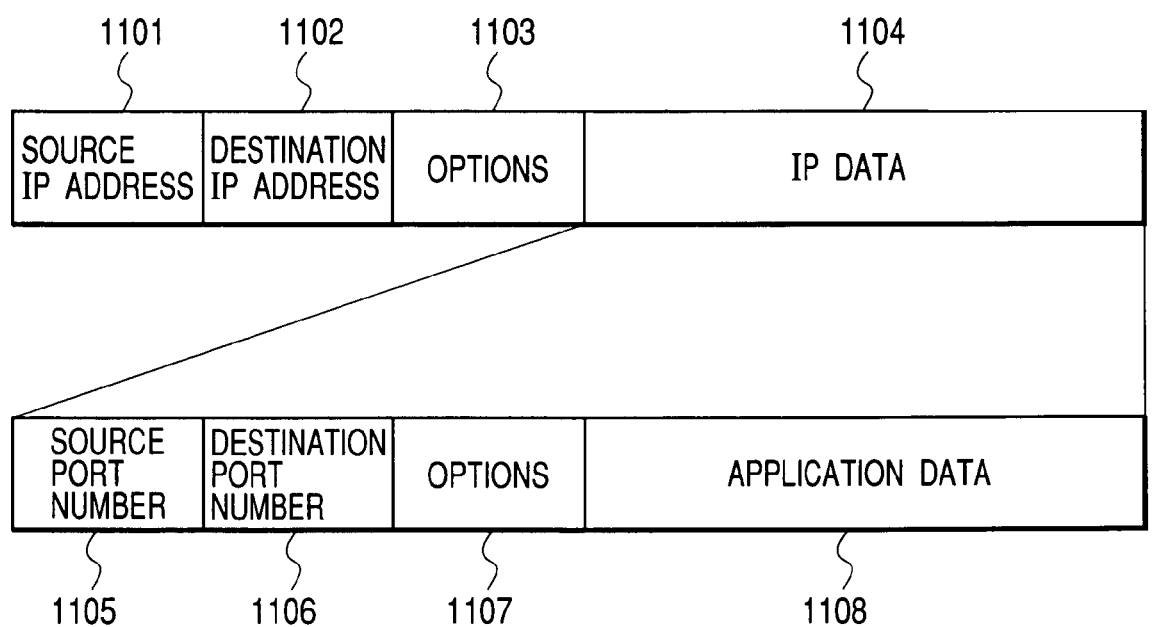
FIG. 11 is a structure of a network packet.

FIG. 11 shows a general structure of a network packet. In FIG. 11, reference numerals are defined as follows; 1101 to 1104 denote IP (Internet Protocol) packets, 1105 to 1108 denote data items set in the IP packet, 1101 denotes a destination IP address and 1102 denotes a source IP address. An IP address is a client/server address used to identify a network to which the client/server is connected. An IP address must be unique at least in one network. IP addresses of both source and destination are specified to begin the communication between a client and a server, between clients, and between servers. In the area 1103 are set options for the subject IP communication. In the area 1104 is stored IP data. Client data is never stored directly in the IP data area. If such an IP packet is lost during communication, no action is taken for it basically. In this connection, processings for checking if an IP packet is lost and determining whether to send the IP packet again if it is lost must be described in the program for sending/receiving IP packets independently. However, this may cause various types of transfer methods to be used in networks and communication compatibility among those networks to be lost, thereby the communication programs are complicated. And, to avoid such problems, a method has been employed. The method adds a layer to the protocol for realizing more enhanced processings than those of the IP and wrapping IP packets with the layer, thereby improving the compatibility and controllability of the networks. The data set in the areas 1105 to 1108 are related to such a layer. Usually, the data is referred to as TCP (Transmission Control Protocol) data. BY wrapping each IP packet with such TCP data provided with functions for re-sending, etc., the controllability and reliability of the communication can be improved more. In the area 1105 is set a destination port number and in the area 1106 is set a source port number. The port number is classified into two types; a number assigned to such a service as a file service and a mail service or such a function and a number decided by an operating system independently. For example, when a client requests a server for a file service, a unique number corresponding to the file service is assigned to the destination port and a unique number that is not used by the subject operating system is assigned to the source port. This port number is used to identify each client with respect to each service and send/receive TCP data to/from the client correctly. Options corresponding to the TCP are set in the area 1107. Application data is stored in the area 1108. For a file service, file I/O data is stored in the application data area (1108).

Figure 12:
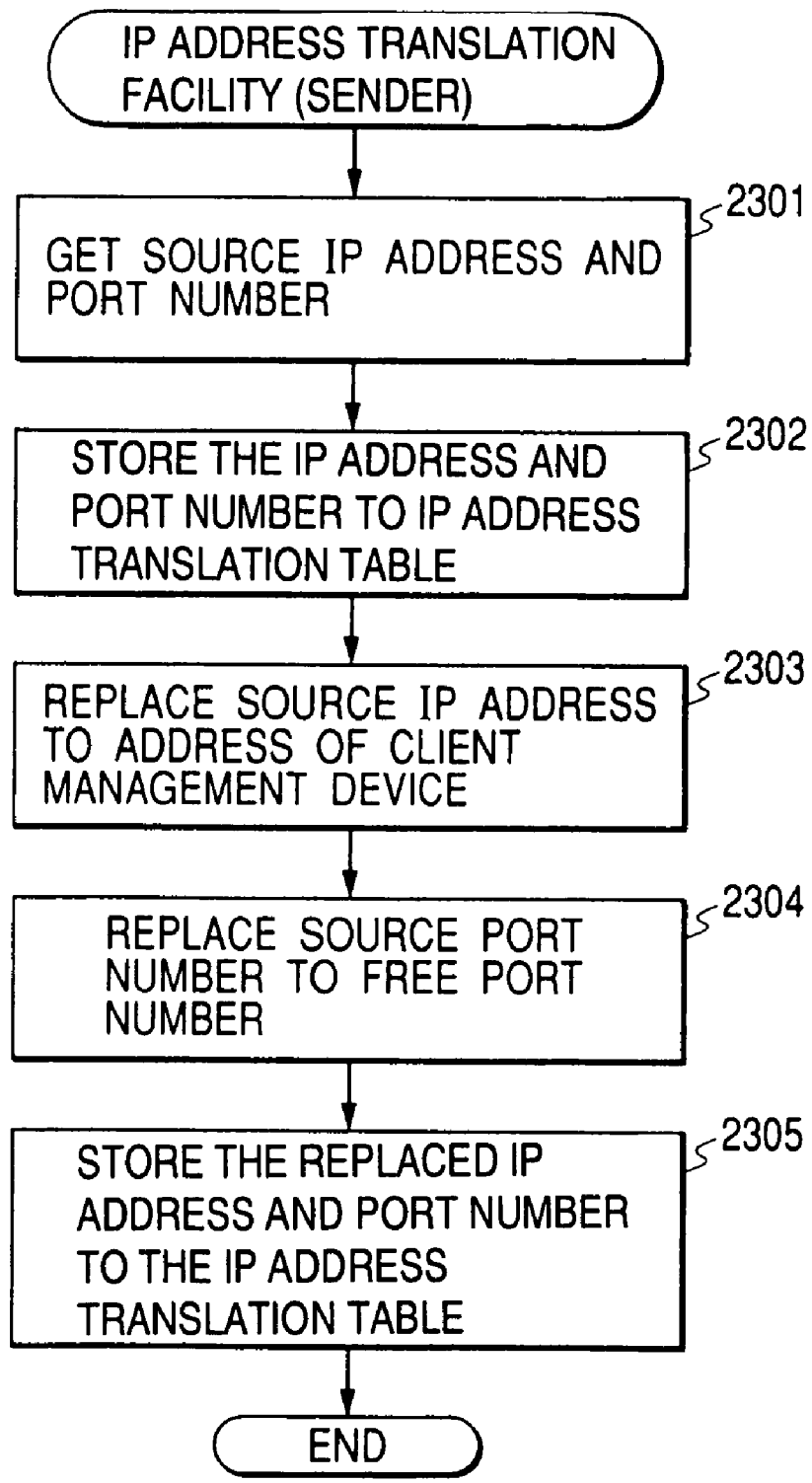
FIG. 12 is a flowchart of the processings of an IP address translation facility for sending data.

FIG. 12 shows a flowchart of the processings of the IP address translation facility (106) for sending an IP packet. In step 2301, the facility (106) obtains both IP address and port number of the request source from the packet to be sent. In step 2302, the facility (106) stores the IP address and the port number of the request source in the IP address translation table (120).

FIG. 15 shows a structure of the IP address translation table (120). Column 1301 describes IP addresses of clients, column 1302 describes port numbers of clients, column 1303 describes translated IP addresses, and column 1304 describes converted port numbers. This table is a table on correspondence used to identify converted IP packets and request sources. In step 2303, the facility (106) translates the source IP address in the received packet to an IP address of the client management device (101). In step 2304, the facility (106) converts the source port number in the packet to a free port number. Before this processing, the currently used port number must be stored in a memory. In step 2305, the facility (106) stores both converted IP address and port number in the IP address translation table (120). Consequently, the facility (106) always translates any of different IP addresses of clients into one and the same IP address.

Figure 13:
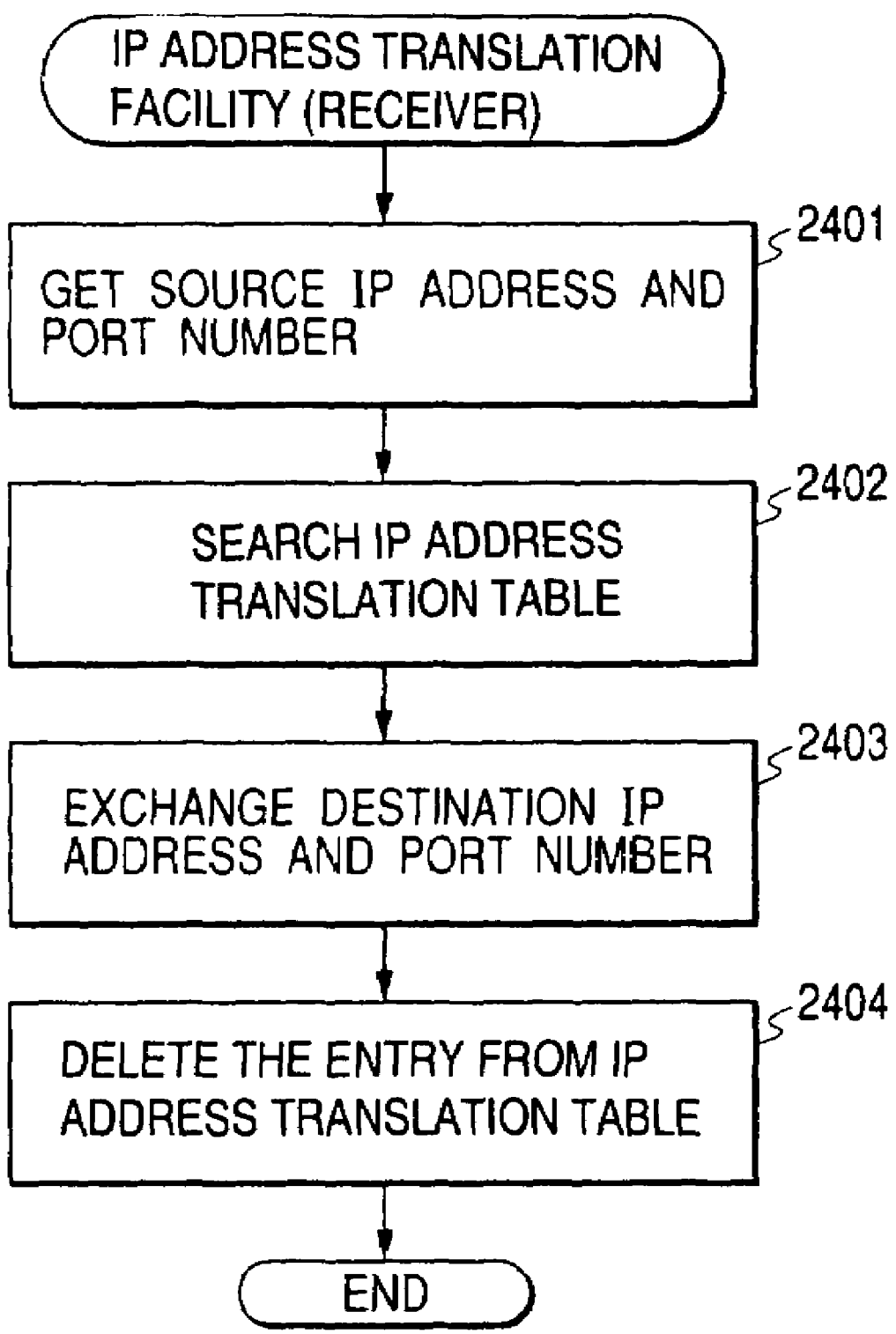
FIG. 13 is a flowchart of the processings of the IP address translation facility for receiving data.

FIG. 13 shows a flowchart of the processings of the IP address translation facility (106) for receiving a packet. In step 2401, the facility (106) obtains both IP address and port number of the destination. In step 2402, the facility (106) searches the data matching with both IP address and port number obtained in step 2402 from the IP address translation table (120). In step 2403, the facility (106) translates the client IP address (1301) and the client port number of the searched in step 2402, as well as both IP address and port number of the received packet destination. In step 2404, the facility (106) deletes the entry from the IP address translation table (120). Those processings are based on the IP address translation method that manages a pair of an IP address and a source port number set in a packet issued from a client, thereby the request source is identified uniquely even after the IP address translation. Consequently, the network file device (111) can manage areas easily, since the client management device (101) can translate IP addresses of a plurality of connected clients into one IP address.

Figure 14:
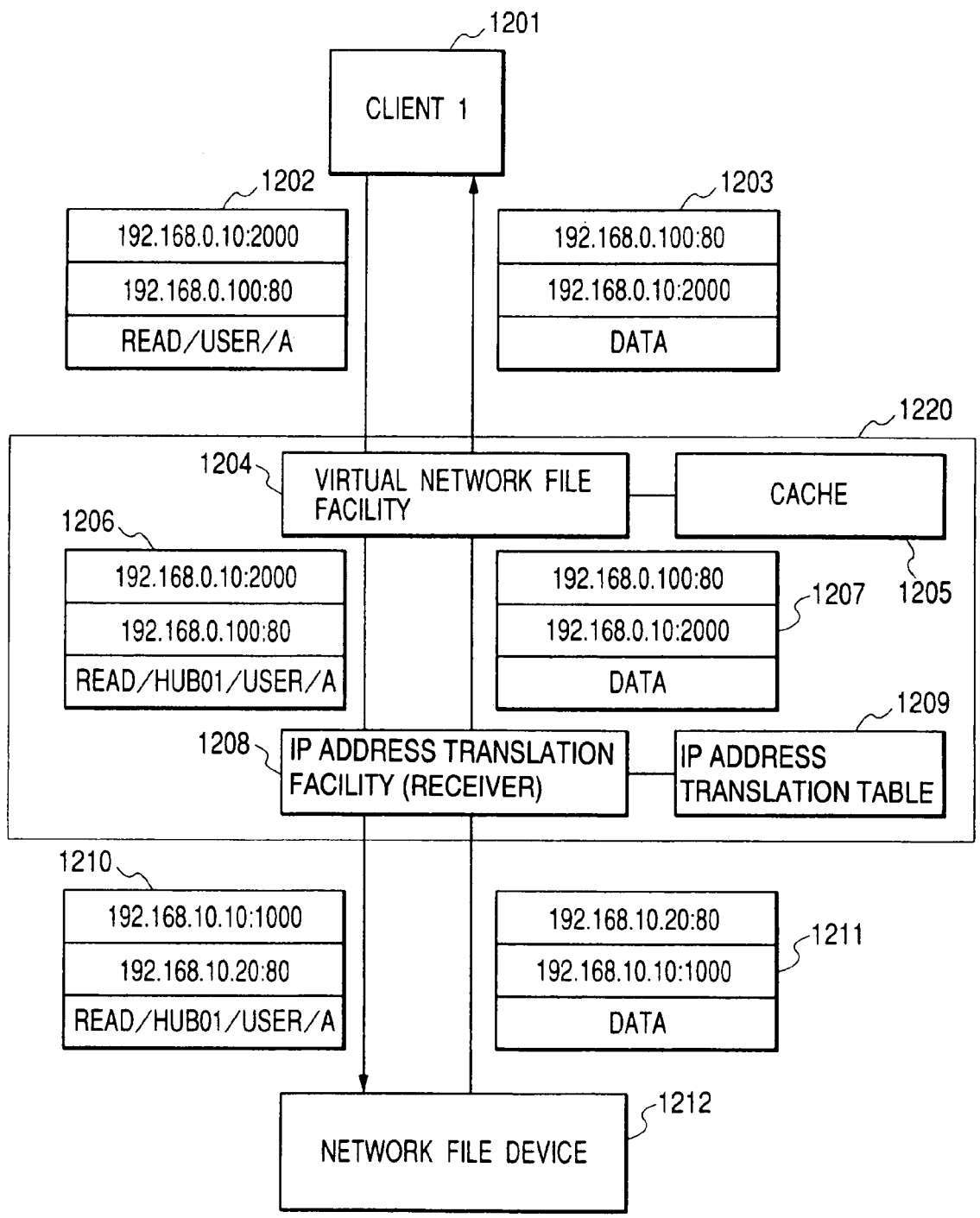
FIG. 14 is a procedure for translating an IP address and changing a file name.

FIG. 14 shows how the above processings are performed more in detail. A client (1201) is connected to the client management device (1220) while the client management device (1220) is connected to the network file device (1212). The client (1201) issues a read request to the client management device (1220). In the read request (1202) are set the client IP address 192.168.0.10, the client port number 2000, the client management device IP address 192.168.0.100, the port number 80 for denoting the target service, the name of the file /user/A that the client (1201) has requested to read. This makes the client (1201) think that the client management device (1220) has the target disk. Receiving this request, the client management device (1220) enables the virtual network file facility (1204) to translate the disk address and adds /HUB01 to the read address just like the packet 1206 so that the address is translated to /HUB01/user/A. If the address /HUB01/user/A is stored in the cache 1220, the facility (106) returns that to the client 1201. If not, the facility (106) passes the packet to the IP address translation facility (1208). The facility (1208) then makes IP address translation so as to translate the source address to 192.168.10.10 that is the IP address of the client management device itself just like the packet 1210. And, the facility (1208) assigns 10000 that is not used yet in the client management device (1220) as the source port number. The facility (106) then sets the IP address of the network file facility (1212) as the destination IP address. The destination port number is the same as that issued from the client (1201), that is, 80. The network file device (1212), when receiving this packet (1210), reads the /HUB01/user/A file and stores the read data in the packet 1211, then returns the packet 1211 to the client management device (1220), which is the direct request source. The client management device (1220), when receiving the packet from the network file device (1212), translates both IP address and port number to the client IP address and the client issued port number through the IP address translation facility (1208) and the IP address translation table (1209) to generate a packet 1207. This packet (1207) is returned to the client (1201) through the virtual network file facility (1204). As described above, because the client management device (1220) can make the client think that the target disk exists in the client management device (1220), it is hidden that a plurality of clients are actually connected to the network file device (1212).

Figure 16:
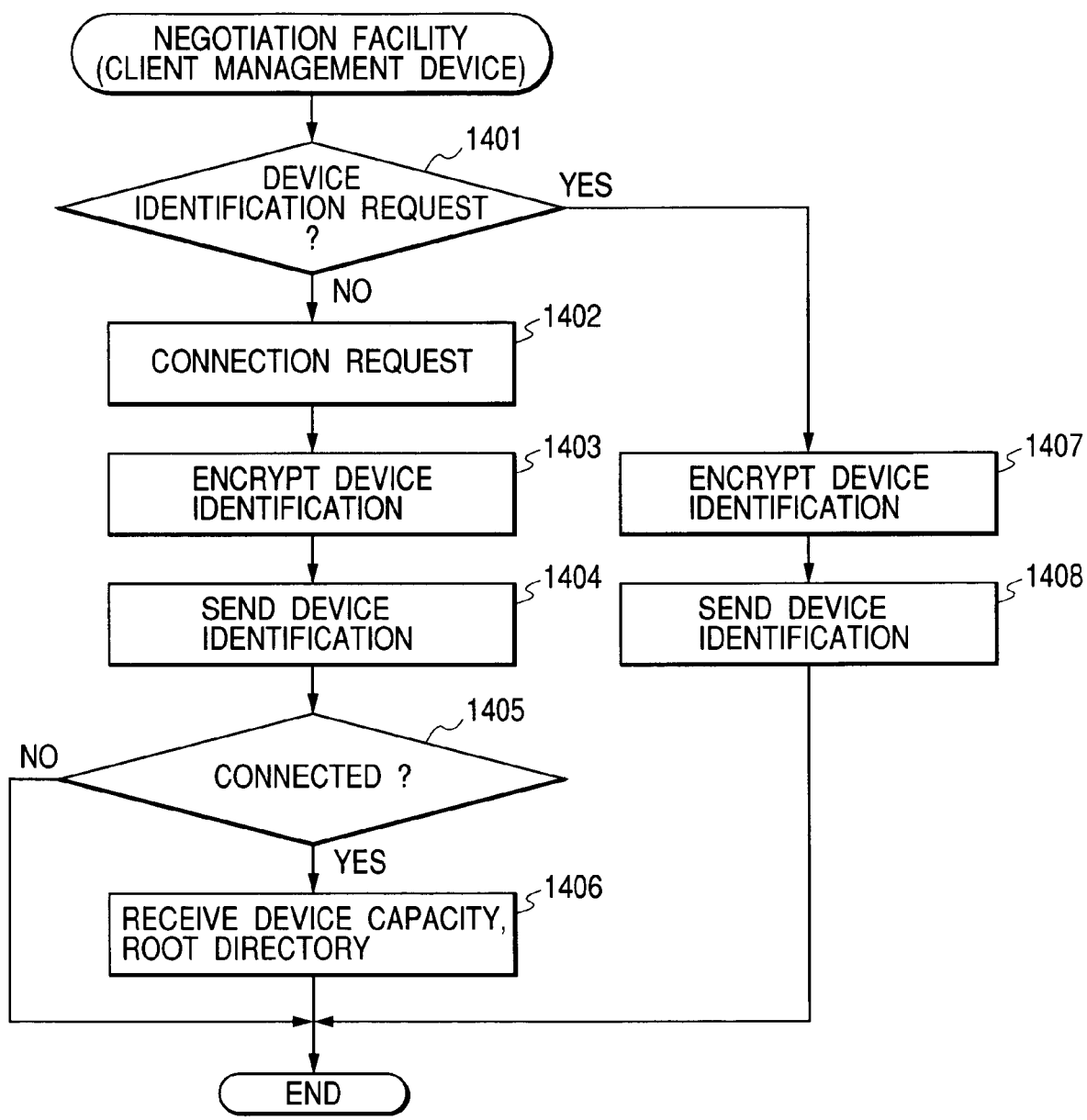
FIG. 16 is a flowchart of the processings of a negotiation facility provided in the client management device.

FIG. 16 shows a flowchart of the processings of the negotiation facility (108) provided in the client management device (102). The negotiation facility (108) establishes communication between the client management device (102) and the network file device (111) correctly so that packets flowing on the subject network are protected from illegal reading by illegal users and detecting such illegal users who pretend to be legal clients so as to read data, thereby disabling their connections. This flow is called when client management device (102) makes a connection to the network file device (111). Then the flow is called periodically from the network file device (111). In step 1401, the facility (108) checks whether or not the request is a device identification request. The device identification request means a request issued by the network file device (111) to call and prompt the facility (108) periodically to transfer a device identifier to the device (111). If the check result is YES (device identification request), control goes to step 1407. If the check result is NO, control goes to step 1402. The facility (108) executes the processings in and after step 1402 at its first connection to the device (111). In step 1402, the facility 8108) request the device (111) for establishing a connection therebetween. In step 1403, the facility (108) encodes the device identifier. The device identifier is specific to the client management device and used only between the client management device and the network file device. Instep 1404, the facility (108) transfers the device identifier encoded in step 1403 to the network file device. In step 1405, the facility (108) checks if the connection to the network file device (111) is established. This check is done by notifying the network file device (111) of permission for connection if the sent device identifier is authenticated by the network file device (111). If the check result is YES (established), control goes to step 1406 in which the facility (108) sends the device capacity usable by the client management device and the root directory of the client management device to the device (111). The root directory is used in step 1001, etc. shown in FIG. 10. There is also another flow that is called periodically from the network file device (111). The processings in and after step 1407 are called periodically from the network file device (111). The object of this flow is to reject accesses with illegal IP addresses. The processings in and after step 1401 are executed by the facility (108) when the client management device is started up. The connection between the client management device and the network file device is continued while the facility (108) sends the device identifier periodically even after the start-up. In step 1407, the facility (108) encodes the device identifier. In step 1408, the facility (108) sends the device identifier encoded in step 1407 to the network file device (111).

Figure 17:
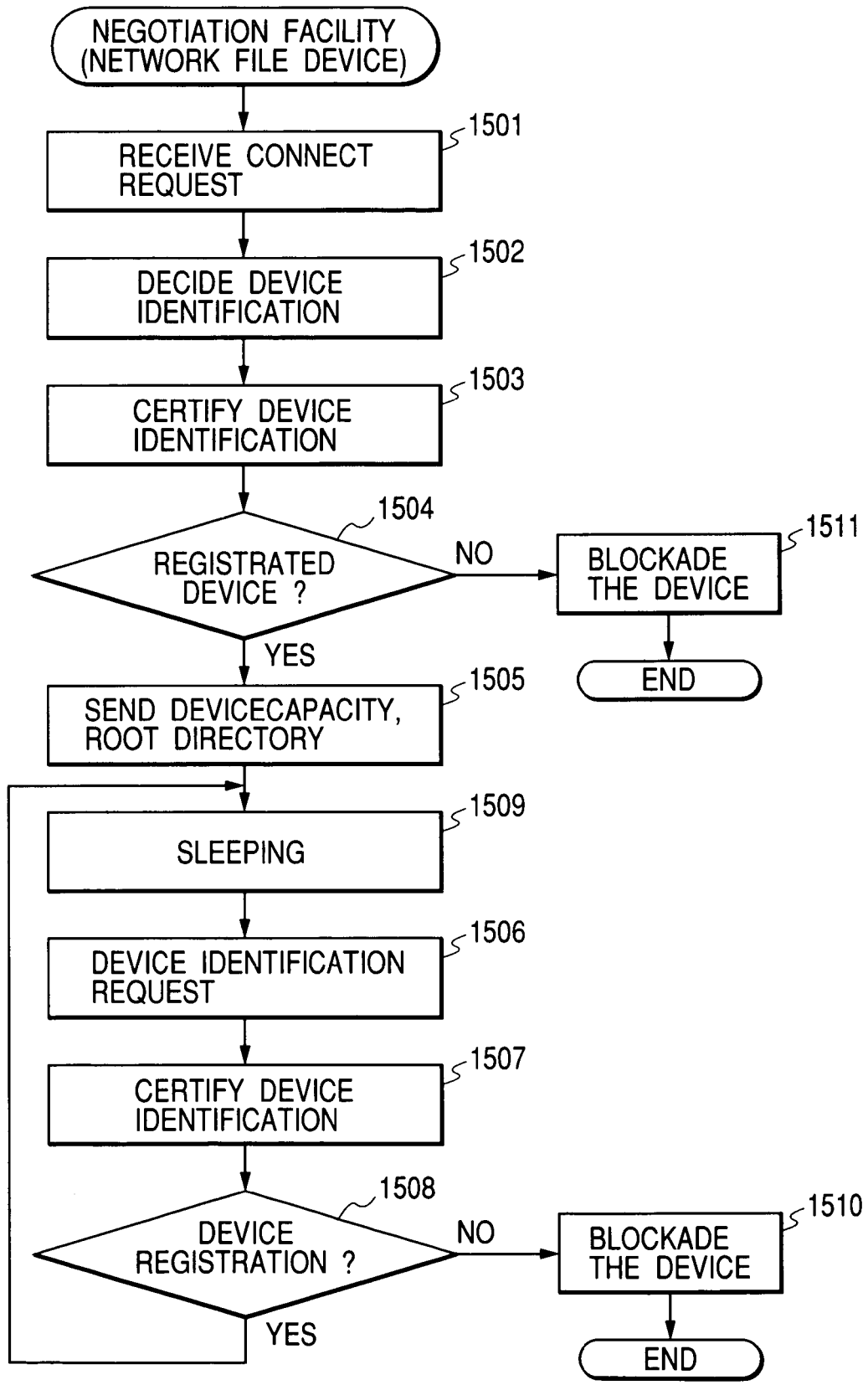
FIG. 17 is a flowchart of the processings of the negotiation facility provided in the network file device.

FIG. 17 shows a flowchart of the processings of the negotiation facility (112) provided in the network file device (111). In step 1501, the negotiation facility (112) accepts a connection request from the client management device (101). In step 1502, the facility (112) decodes the data that includes the device identifier transferred from the client management device (101). In step 1503, the facility (112) checks if the decoded device identifier is correct. If the check result is YES, control goes to step 1505. If the check result is NO, control goes to step 1511, in which the facility determines the access to be illegal and shuts down the client management device (101). At this time, the shut-down range may be set freely. For example, the facility (112) may shut down the device entirely and stops all the accesses therefrom or shuts down only the area allocated to the client management device. In step 1505, the facility (112) sends both usable disk capacity and root directory to the client management device. In step 1509, the facility (112) stops its processing for a certain time. In step 1506, the facility (112) requests the client management device for a device identifier. In step 1507, the facility (112) checks if the device identifier is correct. If the check result is YES (correct) in step 1508, control goes to step 1509. Otherwise, control goes to step 1510, in which the facility (112) shuts down the device. Consequently, the network file device and the client management device can check the device identifier that is only known between them with each other even when an illegal access occurs with a false IP address after the client management device is started up, thereby illegal accesses are detected and data is prevented from illegal reading and altering.

Next, a description will be made for the client migration facility (109), which is another feature of the present invention.

Figure 18:
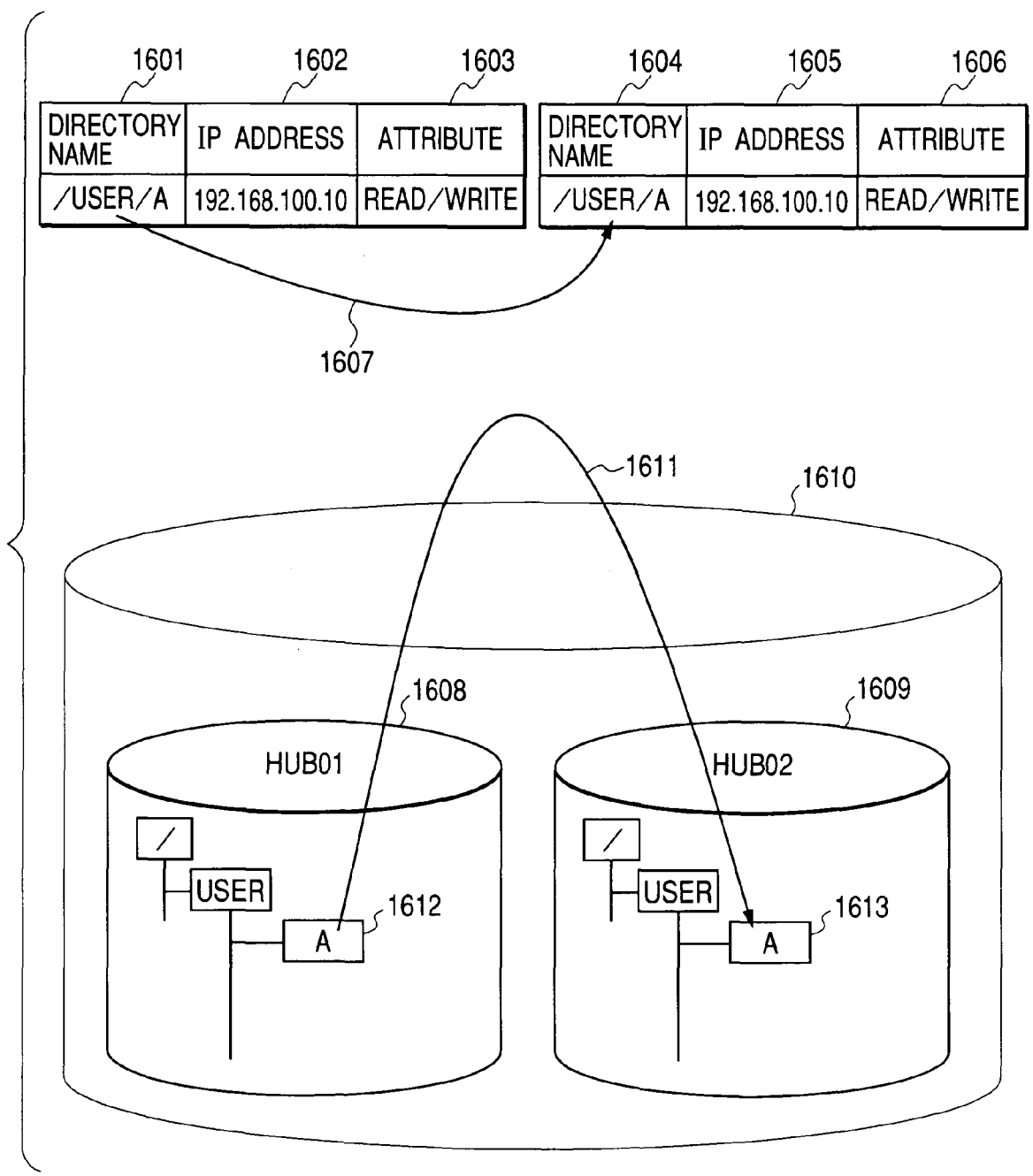
FIG. 18 is a procedure for migrating a client.

FIG. 18 shows how network files are managed when a user moves from a network to another. In FIG. 18, reference numerals are defined as follows; 1601 to 1603 denote migration client management tables (source), 1604 to 1606 denote migration client management tables (destination), 1610 denotes a disk, 1608 denotes a disk area allocated to the migration client management device (source), 1609 denotes a disk area allocated to the migration client management device (destination), 1612 denotes data retained by a migration source client, and 1623 denotes the destination of the data. If a client moves from a network to another, at first the client in the client management table is moved to the new network as denoted with 1607. After that, the client data is fetched from the source disk area 1612 as denoted with 1611 and copied in the destination disk area 1613. Upon this data copying, the user identifier must be changed. The user identifier is a user number determined uniquely for each network. The user identifier is set for each user file and the network file facility stores the identifier as control information in a disk.

FIG. 19 shows a structure of a file management table. The column 1701 describes file names, the column 1702 describes user identifiers, and the column 1703 describes file attributes. Each user identifier 1702 is a unique user number determined by the manager of a network. The network file facility (113) uses such user identifiers to manage file access privileges. In the column 1703, for example, "r" enables reading and "w" enables writing. Usually, the manager updates data in the client management table while each client must make data migration by himself/herself. Data migration is made, for example, as follows. At first, the subject client copies the source data to the client him/herself. Then, the client moves to another network (network migration). At this time, the client gets a new user identifier from the new network manager. The client then changes the user identifier of his/her file to a new one. At this moment, the user identifier of the copied files is changed to the new one. After that, the client transfers the copied file to the destination network file device (111). This completes the migration processing. This is why the present client migration processing casts a heavy work load upon the client.

Figure 20:
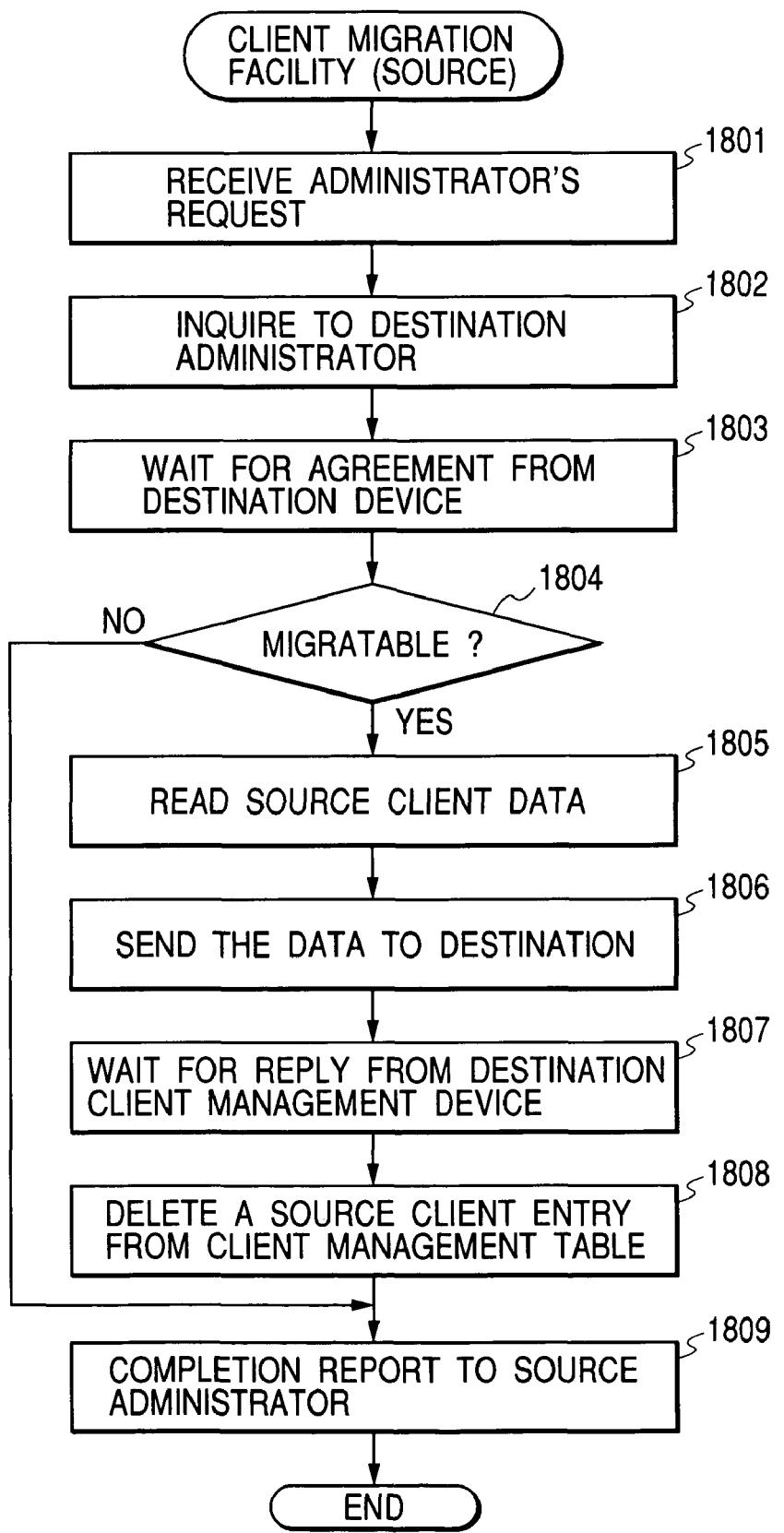
FIG. 20 is a flowchart of the processings of a client migration facility (source)

FIG. 20 shows a flowchart of the processings of the client migration facility (109) (source) provided in the client management device (102). In step 1802, the client migration facility (109) accepts a request from the manager. The request from the manager is to obtain, for example, a list of clients to be migrated in the client management table. In step 1802, the facility (109) makes an inquiry to the destination client management device according to the migration client information received in step 1801. In step 1803, the facility (109) waits for a response from the destination client management device about approval of the migration. At this time, the manager, when the migration is approved, notifies the client management device of the new user identifier of the client. In step 1804, the facility (109) checks whether or not the migration is possible. If the check result is YES (possible), control goes to step 1805. If the check result is NO (not possible) control goes to step 1809. In step 1805, the facility (109) reads the target client data. In step 1806, the facility (109) sends the data read in step 1805 to the destination client management device. In step 1807, the facility (109) waits for a response from the destination client management device about whether or not the client data migration has been completed. In step 1808, the facility (109) deletes the migration completed client information from the client management table provided in the client management device (source). In step 1809, the facility (109) notifies the manager of the client management device of the migration result.

Figure 21:
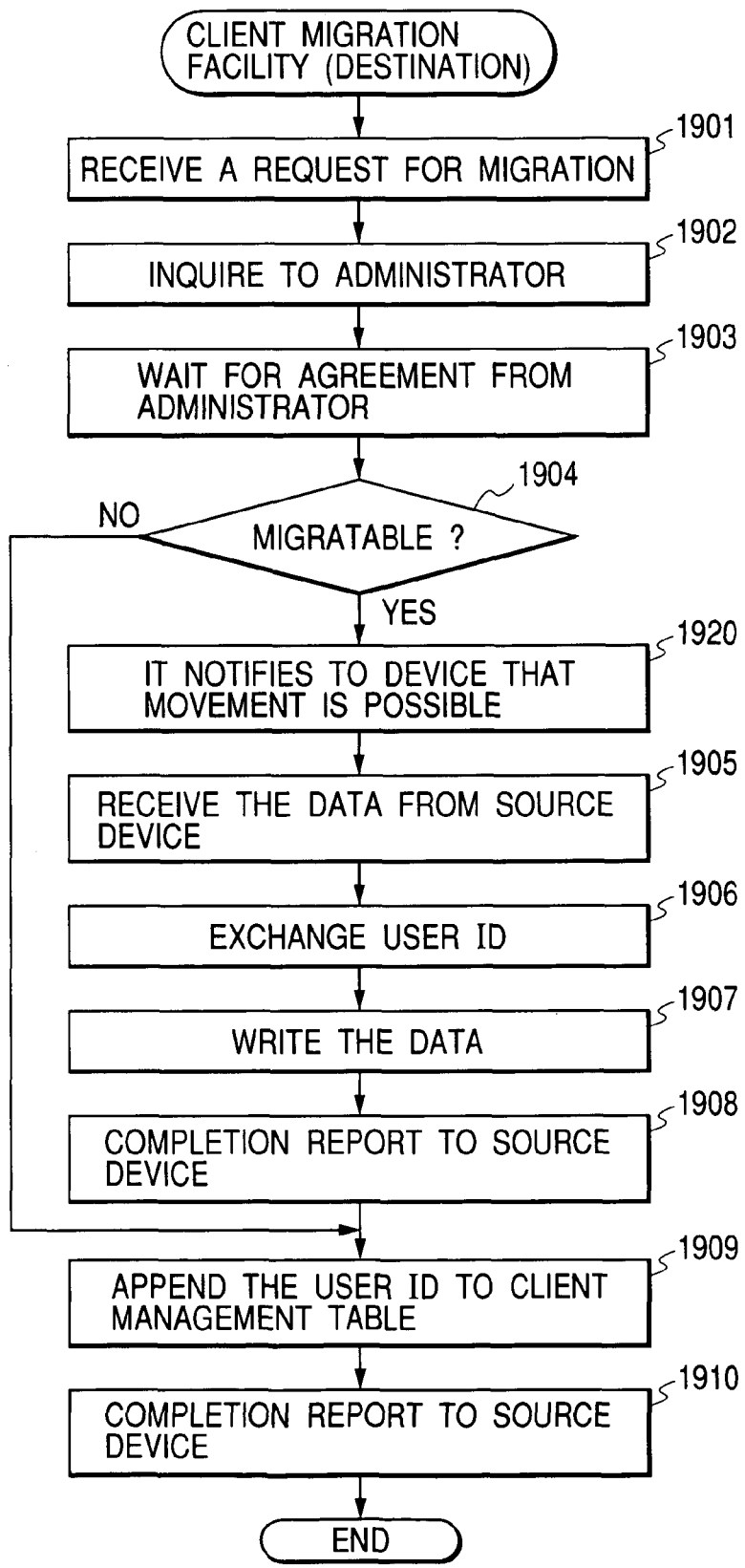
FIG. 21 is a flowchart of the processings of a client migration facility (destination)

FIG. 21 shows a flowchart of the processings of the client migration facility (109) (destination) provided in the client management device (102). Instep 1901, the client migration facility (109) accepts a migration request from the client management device (source). This request includes information of the client to be migrated. In step 1902, the facility (109) inquires whether to migrate the client from the manager of the client management device (destination). In step 1903, the facility (109) waits for the response from the manager. In step 1904, the facility (109) checks if the migration is possible. If the check result is YES (possible), control goes to step 1920. Otherwise, control goes to step 1909. In step 1920, the facility (109) notifies the client management device (source) of the possibility of the client migration. In step 1905, the facility (109) receives the client data from the client management device (source). In step 1906, the facility (109) converts the user identifier of the received data to the new user identifier notified in step 1802. In step 1907, facility (109) writes data of the client whose user identifier is changed in a disk. In step 1908, the facility (109) notifies the client management device (source) of the completion of the client data migration. In step 1909, the facility (109) adds the migrated client information to the client management table provided in the client management device. In step 1910, the facility (109) notifies the manager of the completion of the client migration. As a result of execution of those processings, updating of client management tables and client data migration are enabled between the client management devices (source and destination), thereby the client can omit migration processings. In this embodiment, a description has been made for a procedure for changing a user identifier at the time of data migration. If the client is not moved to a new network, however, there is no need to change the user identifier. Therefore, if client migration is determined to be made only in the present network, the user identifier is not moved. It is also possible to change the user identifier only when the client is moved to a different network.

In the first embodiment, a description has been made for a method for reducing the management load by managing clients in layers with use of the network file device and the client management device connected to the network file device. And, the method can obtain the following effects. Because communication between the client management device and the network file device is encoded, files are accessed in safe even through a network to which many clients are connected, thereby the client management load is reduced. In addition, because a cache is provided in the client management device, data to be accessed frequently from clients is stored in the cache, thereby the access performance is improved. And, because the network file facility enables only a specific client management device to read/write data stored in the cache, data is never read/written from/in the cache by anyone but the clients registered in the client management device. Thus, no access except those through the client management device is made, so that no unmatching error occurs in the cache provided in the client management device. Furthermore, a large scale disk can be divided into a plurality of areas and a client management device can manage each of the divided areas. And, a maximum usable capacity can be set for each of the divided areas. This makes it easier for the network device manager to manage a large disk area.

Second Embodiment

In this second embodiment, the client management device (102) described in the first embodiment is built in the network file device (111). Because of such a configuration, it is possible to suppress the management load required for a large scale disk and reduce the implementation cost.

Figure 22:
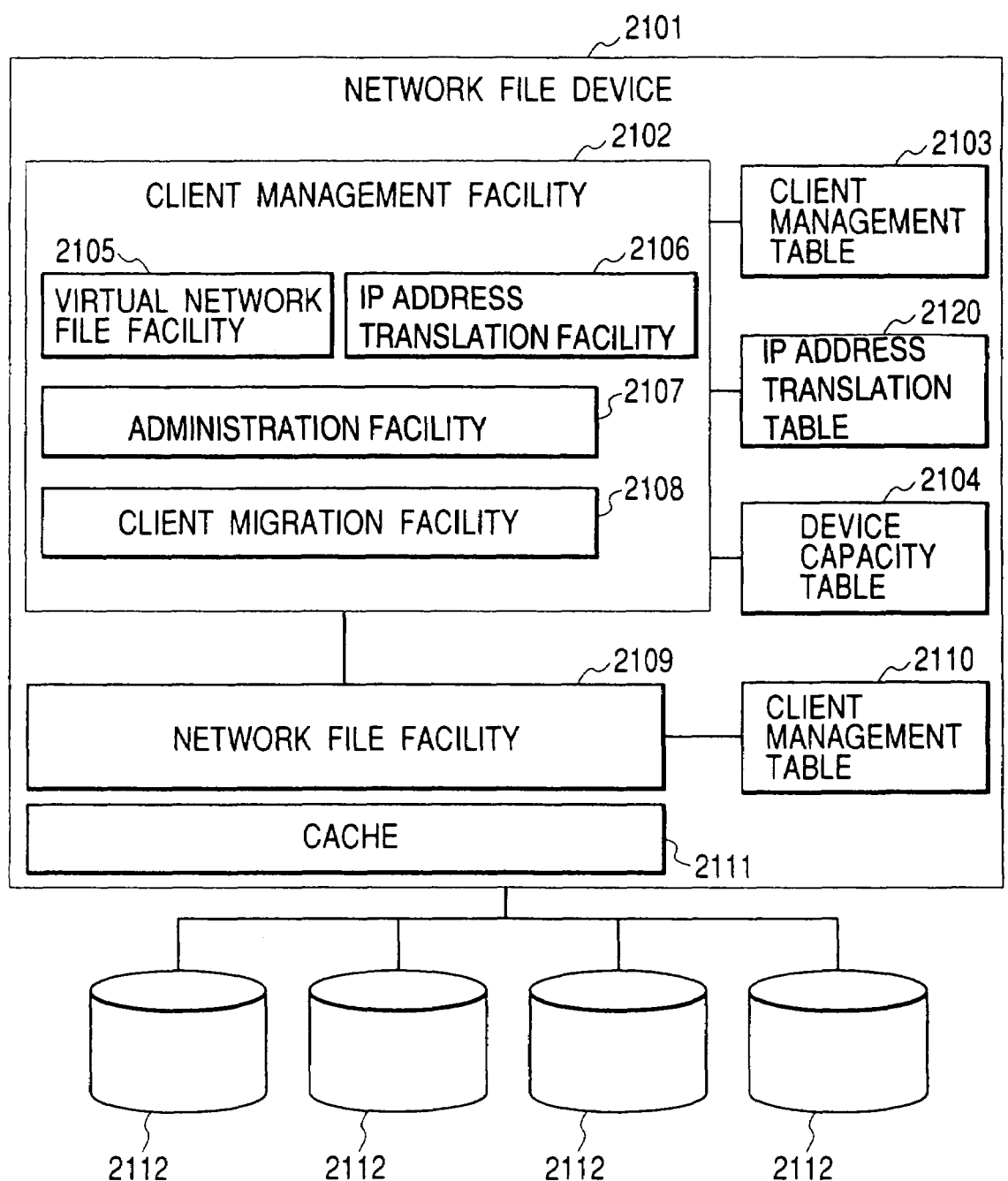
FIG. 22 is an overall block diagram of a network storage system in the second embodiment of the present invention.

FIG. 22 shows a block diagram of a network file device (2101) in the second embodiment of the present invention. The network file device (2101) is configured by a client management facility (2102), client management tables (2103, 2110), an IP address translation table (2120), a device capacity table (2104), a network file facility (2109), and a cache (2111). A plurality of disks (2112) are connected to the network file device (2101). The operation of each block in this second embodiment is the same as that of the block having the same function in the first embodiment. The encoding processing in the first embodiment may be omitted in this second embodiment. This is because the encoding processing is intended mainly to protect the data flowing in the subject network and the communication data is never checked by any third party when the client management facility (2102) is built in the network file device (2101) just like this second embodiment. Because the encoding processings can be omitted as described above, the processing in this second embodiment is speeded up more than in the first embodiment. In addition, while a cache is provided for each client management device in the first embodiment, the cache provided in the network file facility can be used instead of such caches in this second embodiment, thereby the facility is simplified in structure. In spite of this, the client management method is the same between the first and second embodiments. And, the manager of the network file device (2101) is just required to supply an area of a disk connected to the network file device (2101) to each client management facility (2102), so that the manager of each client management device comes to manage clients actually, thereby many clients are managed in layers. The client management facility may be divided into a plurality of facilities. If a plurality of client management facilities similar to that one (2102) are provided for each network, it is possible to manage clients of many networks in layers. Each manager can thus access the network file device (2109) and the client management facilities (2102) through those networks.

Figure 23:
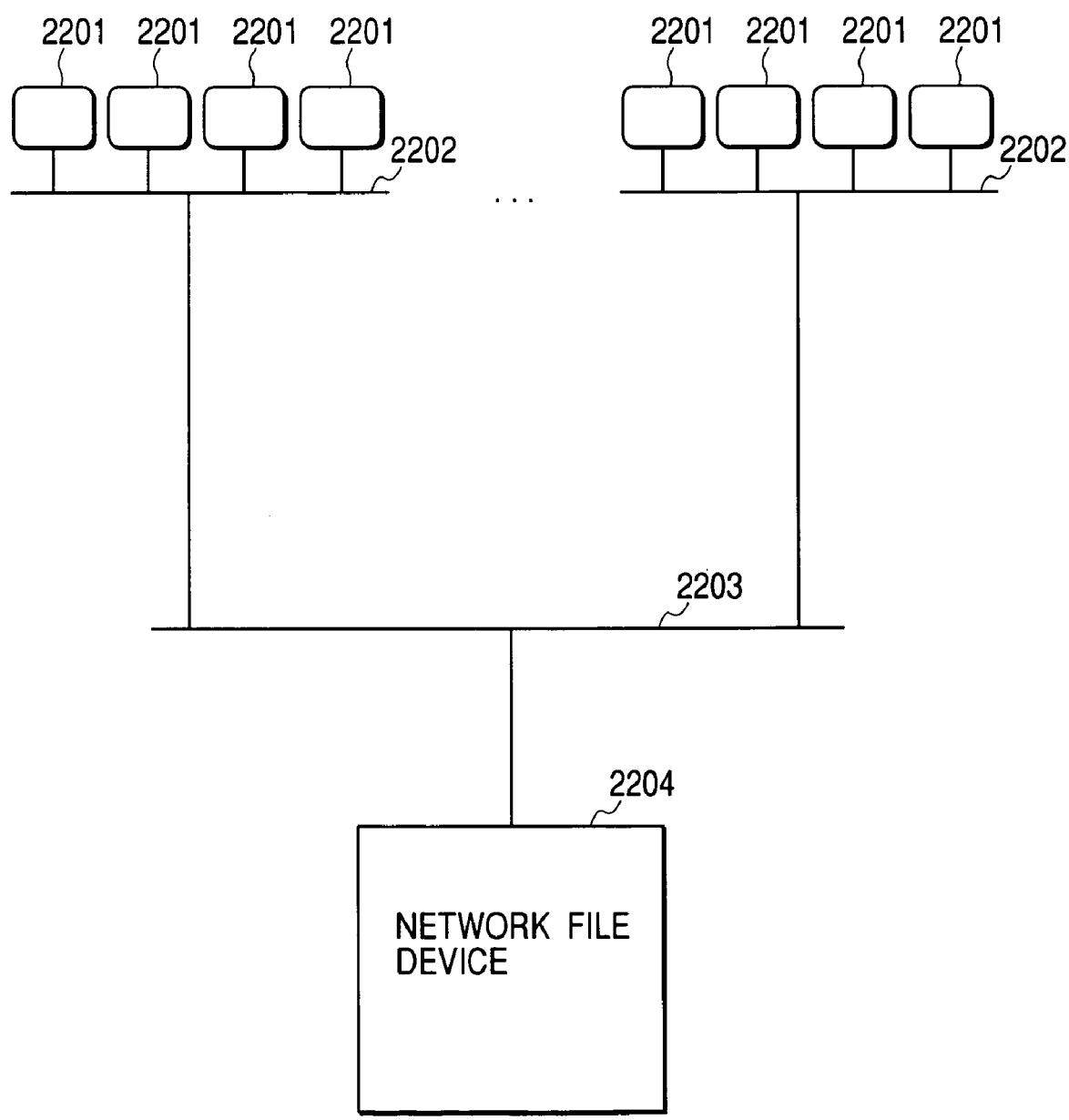
FIG. 23 is a block diagram of a network in the second embodiment of the present invention.

FIG. 23 shows a block diagram of a network in the second embodiment of the present invention. All the clients (2201) are connected to a network file device (2204) second embodiment is simpler in configuration than that in the first embodiment while it can obtain the same effects as those in the first embodiment.

According to the present invention, it is possible to manage clients of a large scale network storage system in layers, thereby the clients are managed more efficiently.

What is claimed is:

1. A network storage system for supplying a storage to a plurality of clients through a network, said system comprising:
   a first device provided with a disk device; and
   a second device for managing a connection to said plurality of clients and relaying an access request issued from a client to said disk device,
   wherein said first device allocates a portion of said disk device to said second device,
   wherein said second device divides said portion allocated by said first device into a plurality of portions, and allocates each of the plurality of portions to a respective one of each of said plurality of clients,
   wherein said second device is provided with means for translating a source network address of said client to a specific network address of the second device, the specific network address to be transferred to said first device, such that the means for translating translates each of a plurality of network addresses of each of said plurality of clients to the specific network address of the second device, and
   wherein said second device adds a preset name of said portion allocated by said first device to a file name included in said access request received from said client and transfers said file name along with said preset name to said first device.

2. The network storage system according to claim 1, wherein said system, when said second device is started up, encodes an identifier specific to said second device, then transfers said encoded identifier to said first device, while said first device decodes said device identifier received from said second device and compares said device identifier received from said second device with device identifiers described in a table stored in said first device so as to enable devices described by the device identifiers to be connected to their objects.

3. The network storage system according to claim 2, wherein said first device requests said second device for transferring of its device identifier periodically, and inhibits said second device to access said allocated portion when receiving no response from said second device or when said device identifier is not found in said table stored in the first device and used to describe devices enabled to access said allocated portion of said disk device.

4. The network storage system according to claim 1, wherein said first device, when said second device is started up, transfers the name of said allocated portion to said second device.

5. The network storage system according to claim 4, wherein said first device notifies said second device of a usable capacity when said second device is started up and said second device makes a check whether or not said capacity is exceeded when receiving a write request from a client and rejects said write request if said capacity is exceeded.

6. The network storage system according to claim 1, wherein said second device encodes a write or read request from a client, then transfers said encoded request to said first device.

7. The network storage system according to claim 1, wherein said second device, when a client's file is to be transferred to another said second device, determines whether or not said file is transferred between different networks and converts a user identifier described in management information of said file if YES is a check result.

8. The network storage system according to claim 7, wherein said second device, when having transferred said file, deletes the management information related to said client who has transferred said file therefrom, and said another second device adds the management information related to said client thereto.

9. The network storage system according to claim 1, wherein said second device is built in said first device.

10. A network storage system connected to a network to which a plurality of clients are connected, said system comprising:
    a network file device for managing a plurality of disk devices; and
    a client management device for relaying an access request issued from a client to a disk device and translating an address of the client to an address of the client management device, so as to access said disk device,
    wherein the client management device translates each of a plurality of addresses of each of the plurality of clients to the address of the client management device,
    wherein said network file device allocates a portion of each of the plurality of said disk devices to said client management device,
    wherein said client management device divides said portion allocated by said network file device into a plurality of portions, and allocates each of the plurality of portions to a respective one of each of said plurality of clients, and
    wherein said client management device adds a preset name of said portion allocated by said network file device to a file name included in said access request received from said client and transfers said file name along with said preset name to said network file device.

11. A network storage system connected to a network to which a plurality of clients are connected, said system comprising:
    a network file device for managing a plurality of disk devices; and
    a client management device for relaying an access request issued from a client to a disk device,
    wherein said network file device allocates a predetermined portion of each of said plurality of disk devices to said client management device,
    wherein said client management device divides said predetermined portion allocated by the network file device into a plurality of portions, and allocates each of the plurality of portions of said predetermined portion to a respective one of each of said plurality of clients, and
    wherein said client management device adds a preset name of said portion allocated by said network file device to a file name included in said access request received from said client and transfers said file name along with said preset name to said network file device.

12. The network storage system according to claim 11, wherein said network file device has a primary cache for storing copy information, which is at least partly disk device information, and wherein said client management device has a secondary cache for storing part of said copy information stored in said primary cache, which corresponds to said predetermined portion allocated to said client management device.

13. The network storage system according to claim 11, wherein said network file device and said network storage system are united into one unit.

14. The network storage system according to claim 11, wherein said network file device and said network storage system are separated from each other and connected to each other through a network.

* * * * *